US011108971B2

(12) United States Patent
Annau et al.

(10) Patent No.: US 11,108,971 B2
(45) Date of Patent: *Aug. 31, 2021

(54) CAMERA ARRAY REMOVING LENS DISTORTION

(71) Applicant: Verizon Patent and Licensing Inc., Basking Ridge, NJ (US)

(72) Inventors: Thomas M. Annau, San Mateo, CA (US); Arthur van Hoff, San Mateo, CA (US); Jens Christensen, San Mateo, CA (US)

(73) Assignee: Verzon Patent and Licensing Ine., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/443,830

(22) Filed: Jun. 17, 2019

(65) Prior Publication Data

US 2019/0306434 A1    Oct. 3, 2019

Related U.S. Application Data

(63) Continuation of application No. 14/810,479, filed on Jul. 28, 2015, now Pat. No. 10,368,011, which is a (Continued)

(51) Int. Cl.
*H04N 5/247* (2006.01)
*H04N 5/232* (2006.01)
(Continued)

(52) U.S. Cl.
CPC ......... *H04N 5/247* (2013.01); *G06Q 30/0263* (2013.01); *G06T 3/4038* (2013.01);
(Continued)

(58) Field of Classification Search
CPC .............. G06Q 30/0263; G06T 19/006; G06T 2207/10012; G06T 2207/20228; G06T 3/4038; G06T 7/97
(Continued)

(56) References Cited

U.S. PATENT DOCUMENTS 4,507,683 A    3/1985 Griesshaber et al.
5,495,576 A    2/1996 Ritchey
(Continued)

FOREIGN PATENT DOCUMENTS

RU    2382406    2/2010
RU    2421933    6/2011
WO    2012/113988    8/2012

OTHER PUBLICATIONS

Mase, et al., "Socially assisted multi-view video viewer", Proceedings of the 13th International Conference on Multimodal Interfaces, ACM, 2011.11, pp. 319-322.

*Primary Examiner* — Thai Q Tran
*Assistant Examiner* — Stephen R Smith

(57) ABSTRACT

The disclosure includes a camera array comprising camera modules, the camera modules comprising a master camera that includes a processor, a memory, a sensor, a lens, a status indicator, and a switch, the switch configured to instruct each of the camera modules to initiate a start operation to start recording video data using the lens and the sensor in the other camera modules and the switch configured to instruct each of the camera modules to initiate a stop operation to stop recording, the status indicator configured to indicate a status of at least one of the camera modules. Lens distortion effects may be removed from the frames described by the video data. The camera modules of the camera array are configured to provide a 3× field of view overlap.

20 Claims, 25 Drawing Sheets

293

After the undistorted distance, d, is computed the distorted pixel coordinates ($x_D$ and $y_D$) can be remapped to (undistorted) pixel coordinates, $x$ and $y$:

$$x = c_x - x_D \cdot d \cdot k_5$$
$$y = c_y - y_D \cdot d \cdot k_4$$

where $x_D$ and $y_D$ denote the coordinates of the acquired (lens-) distorted pixels, centered at the optical center of the lens. $c_x$ and $c_y$, and $d$ the euclidean distance from the optical center.

Related U.S. Application Data continuation-in-part of application No. 14/444,938, filed on Jul. 28, 2014, now Pat. No. 9,451,162.

(60) Provisional application No. 62/029,254, filed on Jul. 25, 2014.

(51) Int. Cl.

| | | |
|---|---|---|
| *G06T 19/00* | (2011.01) | |
| *H04N 5/225* | (2006.01) | |
| *G06T 3/40* | (2006.01) | |
| *H04N 13/111* | (2018.01) | |
| *H04N 13/243* | (2018.01) | |
| *G06Q 30/02* | (2012.01) | |
| *G06T 7/00* | (2017.01) | |
| *H04N 13/106* | (2018.01) | |
| *H04N 13/271* | (2018.01) | |
| *H04N 7/18* | (2006.01) | |

(52) U.S. Cl.
CPC .............. *G06T 7/97* (2017.01); *G06T 19/006* (2013.01); *H04N 5/2258* (2013.01); *H04N 5/23238* (2013.01); *H04N 13/106* (2018.05); *H04N 13/111* (2018.05); *H04N 13/243* (2018.05); *H04N 13/271* (2018.05); *G06T 2207/10012* (2013.01); *G06T 2207/20228* (2013.01); *H04N 7/181* (2013.01)

(58) Field of Classification Search
USPC ......... 386/201, 223, 341; 348/36–39, 42–60, 348/218.1, 153, 159, 211.11
See application file for complete search history.

(56) References Cited

U.S. PATENT DOCUMENTS

| | | | |
|---|---|---|---|
| 6,128,108 | A | 10/2000 | Teo |
| 6,141,034 | A | 10/2000 | McCutchen |
| 6,212,468 | B1 | 4/2001 | Nakayama et al. |
| 6,747,644 | B1 | 6/2004 | Deering |
| 6,767,287 | B1 | 7/2004 | Mcquaid et al. |
| 6,865,289 | B1 | 3/2005 | Berestov |
| 7,155,680 | B2 | 12/2006 | Akazawa et al. |
| 7,884,848 | B2 | 2/2011 | Ginther |
| 8,478,111 | B2 | 7/2013 | Stankiewicz et al. |
| 8,581,961 | B2 | 11/2013 | Lee |
| 8,644,596 | B1 | 2/2014 | Wu et al. |
| 8,681,224 | B2 | 3/2014 | Mallon et al. |
| 8,750,509 | B2 | 6/2014 | Renkis |
| 8,848,066 | B2 | 9/2014 | Porter et al. |
| 8,867,827 | B2 | 10/2014 | Yeatman et al. |
| 9,001,226 | B1 | 4/2015 | Ng et al. |
| 9,262,831 | B2 | 2/2016 | Munzenmayer et al. |
| 9,264,598 | B1 | 2/2016 | Baldwin |
| 9,282,367 | B2 | 3/2016 | Daub |
| 9,396,588 | B1 | 7/2016 | Li |
| 9,589,350 | B1 | 3/2017 | Kozko |
| 9,742,991 | B2 | 8/2017 | Latorre |
| 9,774,887 | B1 | 9/2017 | Walkingshaw |
| 9,911,454 | B2 | 3/2018 | Van Hoff et al. |
| 10,210,898 | B2 | 2/2019 | Van Hoff et al. |
| 10,313,665 | B2 | 6/2019 | Walkingshaw |
| 10,440,398 | B2 | 10/2019 | Walkingshaw et al. |
| 2001/0015751 | A1 | 8/2001 | Geng |
| 2002/0075295 | A1 | 6/2002 | Stentz et al. |
| 2002/0171741 | A1 | 11/2002 | Tonkin et al. |
| 2003/0025805 | A1 | 2/2003 | Yamagishi |
| 2003/0117488 | A1 | 6/2003 | Pierce et al. |
| 2004/0008256 | A1 | 1/2004 | Kim |
| 2004/0027451 | A1 | 2/2004 | Baker |
| 2004/0066449 | A1 | 4/2004 | Givon |
| 2004/0196378 | A1 | 10/2004 | Kannermark et al. |
| 2004/0246333 | A1 | 12/2004 | Steuart |
| 2005/0062869 | A1 | 3/2005 | Zimmermann et al. |
| 2005/0069167 | A1 | 3/2005 | Zarrabizadeh |
| 2006/0082663 | A1 | 4/2006 | Rooy et al. |
| 2007/0027844 | A1 | 2/2007 | Toub et al. |
| 2007/0035627 | A1 | 2/2007 | Cleary et al. |
| 2007/0097206 | A1 | 5/2007 | Houvener et al. |
| 2007/0146530 | A1 | 6/2007 | Nose |
| 2007/0159527 | A1 | 7/2007 | Kim et al. |
| 2007/0263076 | A1 | 11/2007 | Andrews et al. |
| 2008/0091526 | A1 | 4/2008 | Shoemaker |
| 2008/0143842 | A1 | 6/2008 | Gillard et al. |
| 2008/0262910 | A1 | 10/2008 | Altberg et al. |
| 2008/0263458 | A1 | 10/2008 | Altberg et al. |
| 2009/0076894 | A1 | 3/2009 | Bates et al. |
| 2009/0238378 | A1* | 9/2009 | Kikinis ............... H04N 13/398 381/92 |
| 2009/0249244 | A1 | 10/2009 | Robinson et al. |
| 2009/0288002 | A1 | 11/2009 | Hamilton et al. |
| 2010/0036735 | A1 | 2/2010 | Hamilton et al. |
| 2010/0045773 | A1 | 2/2010 | Ritchey |
| 2010/0083139 | A1 | 4/2010 | Dawson et al. |
| 2010/0097444 | A1 | 4/2010 | Lablans |
| 2010/0100429 | A1 | 4/2010 | McCloskey et al. |
| 2010/0119105 | A1 | 5/2010 | Moriya et al. |
| 2010/0141733 | A1* | 6/2010 | Borchers ............... H04N 5/232 348/36 |
| 2010/0164956 | A1 | 7/2010 | Hyndman et al. |
| 2010/0169842 | A1 | 7/2010 | Migos |
| 2010/0315479 | A1 | 12/2010 | Wijngaarden et al. |
| 2010/0318467 | A1 | 12/2010 | Porter et al. |
| 2010/0332980 | A1 | 12/2010 | Sun et al. |
| 2011/0058749 | A1 | 3/2011 | Cooper |
| 2011/0142132 | A1 | 6/2011 | Tourapis et al. |
| 2011/0157305 | A1 | 6/2011 | Kosakai et al. |
| 2011/0193956 | A1 | 8/2011 | Gilg et al. |
| 2011/0267510 | A1 | 11/2011 | Malone et al. |
| 2012/0050474 | A1 | 3/2012 | Segall |
| 2012/0056977 | A1 | 3/2012 | Ohnishi |
| 2012/0069236 | A1 | 3/2012 | Namba et al. |
| 2012/0105632 | A1 | 5/2012 | Renkis |
| 2012/0113278 | A1* | 5/2012 | Okada ............... H04N 5/23258 348/208.4 |
| 2012/0155786 | A1 | 6/2012 | Zargarpour et al. |
| 2012/0162362 | A1* | 6/2012 | Garden ............... H04N 13/366 348/42 |
| 2012/0169842 | A1 | 7/2012 | Chuang et al. |
| 2012/0194712 | A1 | 8/2012 | Crook et al. |
| 2012/0203640 | A1 | 8/2012 | Karmarkar et al. |
| 2012/0218296 | A1 | 8/2012 | Belimpasakis et al. |
| 2012/0218376 | A1* | 8/2012 | Athan ............... H04N 5/232 348/36 |
| 2012/0232998 | A1 | 9/2012 | Schoen |
| 2012/0240077 | A1 | 9/2012 | Vaittinen et al. |
| 2012/0242788 | A1 | 9/2012 | Chuang et al. |
| 2012/0242794 | A1 | 9/2012 | Park et al. |
| 2012/0257095 | A1 | 10/2012 | Velazquez |
| 2012/0290401 | A1 | 11/2012 | Neven |
| 2012/0310717 | A1 | 12/2012 | Kankainen |
| 2012/0324493 | A1 | 12/2012 | Holmdahl et al. |
| 2012/0324494 | A1 | 12/2012 | Burger et al. |
| 2013/0016186 | A1 | 1/2013 | Atanassov et al. |
| 2013/0031475 | A1 | 1/2013 | Maor et al. |
| 2013/0035110 | A1 | 2/2013 | Sridhara et al. |
| 2013/0044187 | A1 | 2/2013 | Hammes et al. |
| 2013/0054576 | A1 | 2/2013 | Karmarkar et al. |
| 2013/0080974 | A1 | 3/2013 | Suzuki |
| 2013/0083159 | A1 | 4/2013 | Ooshima |
| 2013/0103624 | A1 | 4/2013 | Thieberger |
| 2013/0117375 | A1 | 5/2013 | Bist et al. |
| 2013/0124471 | A1 | 5/2013 | Chen et al. |
| 2013/0188010 | A1 | 7/2013 | Dortch et al. |
| 2013/0212606 | A1 | 8/2013 | Kannan et al. |
| 2013/0223537 | A1 | 8/2013 | Kasai et al. |
| 2013/0235347 | A1 | 9/2013 | Hennessey et al. |
| 2013/0250047 | A1 | 9/2013 | Hollinger |
| 2013/0258044 | A1 | 10/2013 | Betts-Lacroix |
| 2013/0259447 | A1 | 10/2013 | Sathish et al. |
| 2013/0266211 | A1 | 10/2013 | Tippetts et al. |
| 2013/0278631 | A1 | 10/2013 | Border et al. |

(56) References Cited

U.S. PATENT DOCUMENTS

| | | |
|---|---|---|
| 2013/0278635 A1 | 10/2013 | Maggiore |
| 2014/0005484 A1 | 1/2014 | Charles |
| 2014/0067828 A1 | 3/2014 | Archibong et al. |
| 2014/0071234 A1 | 3/2014 | Millett |
| 2014/0086446 A1 | 3/2014 | Han et al. |
| 2014/0089097 A1 | 3/2014 | Byun et al. |
| 2014/0097251 A1 | 4/2014 | Joussen et al. |
| 2014/0099022 A1 | 4/2014 | McNamer |
| 2014/0099623 A1 | 4/2014 | Amit et al. |
| 2014/0104378 A1 | 4/2014 | Kauff et al. |
| 2014/0125774 A1* | 5/2014 | Lee ................ H04N 13/20 348/47 |
| 2014/0126066 A1 | 5/2014 | Clavin et al. |
| 2014/0132788 A1 | 5/2014 | Ramsay et al. |
| 2014/0146132 A1 | 5/2014 | Bagnato et al. |
| 2014/0153916 A1 | 6/2014 | Kintner |
| 2014/0176749 A1 | 6/2014 | Horowitz |
| 2014/0184550 A1 | 7/2014 | Hennessey et al. |
| 2014/0201126 A1 | 7/2014 | Zadeh et al. |
| 2014/0232822 A1* | 8/2014 | Venkataraman ........ G06K 9/66 348/43 |
| 2014/0237495 A1 | 8/2014 | Jang et al. |
| 2014/0245335 A1 | 8/2014 | Holden et al. |
| 2014/0247352 A1 | 9/2014 | Rathi et al. |
| 2014/0267596 A1 | 9/2014 | Geerds |
| 2014/0270684 A1 | 9/2014 | Jayaram et al. |
| 2014/0280549 A1 | 9/2014 | Rajan et al. |
| 2014/0285486 A1 | 9/2014 | Chang et al. |
| 2014/0300532 A1 | 10/2014 | Karkkainen et al. |
| 2014/0309495 A1 | 10/2014 | Kirma et al. |
| 2014/0310630 A1 | 10/2014 | Asikainen et al. |
| 2014/0320608 A1 | 10/2014 | Muukki |
| 2014/0341484 A1 | 11/2014 | Sebring |
| 2014/0359647 A1 | 12/2014 | Shoemake et al. |
| 2014/0359656 A1 | 12/2014 | Banica et al. |
| 2014/0368609 A1 | 12/2014 | Chang et al. |
| 2015/0012827 A1 | 1/2015 | Elmeih et al. |
| 2015/0026718 A1 | 1/2015 | Seyller |
| 2015/0042953 A1 | 2/2015 | Teller |
| 2015/0050006 A1 | 2/2015 | Sipe |
| 2015/0058630 A1 | 2/2015 | Bae et al. |
| 2015/0067708 A1 | 3/2015 | Jensen et al. |
| 2015/0124088 A1 | 5/2015 | Vera et al. |
| 2015/0130705 A1 | 5/2015 | Im |
| 2015/0138065 A1 | 5/2015 | Alfieri |
| 2015/0169076 A1 | 6/2015 | Cohen et al. |
| 2015/0199006 A1 | 7/2015 | He et al. |
| 2015/0206329 A1 | 7/2015 | Devries |
| 2015/0208131 A1 | 7/2015 | Chatter et al. |
| 2015/0220768 A1 | 8/2015 | Ronnecke et al. |
| 2015/0235434 A1 | 8/2015 | Miller et al. |
| 2015/0248918 A1 | 9/2015 | Tang |
| 2015/0260526 A1 | 9/2015 | Paduano et al. |
| 2015/0264092 A1 | 9/2015 | Herger et al. |
| 2015/0271483 A1 | 9/2015 | Sun et al. |
| 2015/0309310 A1 | 10/2015 | Cho et al. |
| 2015/0316982 A1 | 11/2015 | Miller |
| 2015/0317353 A1 | 11/2015 | Zavesky |
| 2015/0350561 A1 | 12/2015 | Vartanian |
| 2015/0356371 A1 | 12/2015 | Libal et al. |
| 2015/0373266 A1 | 12/2015 | Hsieh et al. |
| 2015/0379697 A1* | 12/2015 | Pohl .................. G06T 5/50 345/589 |
| 2016/0011658 A1 | 1/2016 | Lopez et al. |
| 2016/0026253 A1 | 1/2016 | Bradski et al. |
| 2016/0027216 A1 | 1/2016 | Da Veiga et al. |
| 2016/0037026 A1 | 2/2016 | Kintner |
| 2016/0037030 A1 | 2/2016 | Weissig et al. |
| 2016/0050370 A1 | 2/2016 | Campbell |
| 2016/0077710 A1 | 3/2016 | Lewis et al. |
| 2016/0156842 A1 | 6/2016 | Baldwin |
| 2016/0279516 A1 | 9/2016 | Gupta et al. |
| 2016/0286137 A1* | 9/2016 | Marks ............... H04N 5/23238 |
| 2016/0295194 A1 | 10/2016 | Wang et al. |
| 2016/0306431 A1 | 10/2016 | Stafford et al. |
| 2017/0278306 A1 | 9/2017 | Rico |
| 2017/0280056 A1 | 9/2017 | Chapdelaine-Couture et al. |
| 2017/0329817 A1 | 11/2017 | Stoica-Beck et al. |
| 2018/0096507 A1 | 4/2018 | Valdivia et al. |
| 2018/0192094 A1 | 7/2018 | Barnett et al. |
| 2018/0357810 A1 | 12/2018 | Young et al. |
| 2019/0052869 A1 | 2/2019 | Lutter et al. |
| 2019/0052870 A1 | 2/2019 | Lutter et al. |
| 2019/0265945 A1 | 8/2019 | Newell et al. |

* cited by examiner

299 — $|V| = \sqrt{\hat{X}^2 + \hat{Y}^2 + \hat{Z}^2}$

298 — $V_N = \frac{V}{|V|}$

297 —
$$V_Z = V \cdot v_Z$$
$$V_X = V \cdot v_X$$
$$V_Y = V \cdot v_Y$$

$$\alpha = atan\frac{|V_X + V_Y|}{|V_Z|}$$

where $v_{X,Y,Z}$ is the unit vector in (x,y,z)-direction

Figure 2B $d = -k2/(3.*k3) + (cbrt(2.)*(-pow(k2,2) + 3.*k1*k3))/$
$(3.*k3*cbrt(2*pow(k2,3) - 9.*k1*k2*k3 - 27.*a*pow(k3,2) +$
$sqrt(4.*pow(-pow(k2,2) + 3.*k1*k3,3) + pow(2*pow(k2,3) - 9.*k1*k2*k3 -$
$27.*a*pow(k3,2),2))) - cbrt(2.*pow(k2,3) - 9.*k1*k2*k3 - 27.*a*pow(k3,2) +$
$sqrt(4*pow(-pow(k2,2) + 3*k1*k3,3) + pow(2*pow(k2,3) - 9.*k1*k2*k3 -$
$27.*a*pow(k3,2),2))/(3.*cbrt(2.)*k3);$ where $pow(n,p)$ denotes $n^p$, $cbrt(n)$ the cubic root of $n$ or $n^{(1/3)}$

— 296

$d = ((sqrt(4*a*k2 + k1*k1) - k1)/(2*k2))$

— 295

Where $k2 = 0, k3 = 0$ and $k1 \neq 0$ leads to a more simplified solution, $d = \frac{a}{k_1}.$

After the undistorted distance, $d$, is computed the distorted pixel coordinates ($x_D$- and $y_D$) can be remapped to (undistorted) pixel coordinates, $x$ and $y$:

$x = c_X - x_D \cdot d \cdot k_3$
$y = c_Y - y_D \cdot d \cdot k_4$, where $x_D$- and $y_D$ denote the coordinates of the acquired (lens-) distorted pixels, centered at the optical center of the lens, $c_X$ and $c_Y$, and $d$ the euclidean distance from the optical center.

$$\hat{X} = \frac{x - c_x}{k_5}$$

$$\hat{Y} = \frac{y - c_y}{k_4}$$

$$d = \sqrt{x^2 + y^2}$$

$$\hat{Z} = \frac{d}{\tan(d \cdot k_1 + d^2 k_2 + d^3 k_3)}$$

$$V = (\hat{X}, \hat{Y}, \hat{Z})$$

which form the vector V. The "length" of V, |V| is computed using the euclidian norm:

$$|V| = \sqrt{\hat{X}^2 + \hat{Y}^2 + \hat{Z}^2}$$

$$V_N = \frac{V}{|V|}$$

where || denotes the euclidian norm, and $V_N$ the normalized vector of 3D world coordinates to compute the 3D coordinate $W$ in world coordinates given a distance of the object:

290

$$W = V_N * dist$$

where $dist$ is the euclidian distance between the camera and the world object that is represented by the pixel$(x,y)$.

Figure 2F

289 — To 2D given W:
A 3D point $W_i$ is captured with a camera and experiences lens aberration before being captured by the image sensor.

$W(X,Y,Z)$ (point in 3D world) ↦ *lens aberration* ↦ $x_D$- and $y_D$ (distorted 2D image) ↦ lens undistortion (forward model) ↦ $x, y$ (undistorted 2D image)

288 — To 3D/real world given distance |W|:
$x_D$- and $y_D$ & given distance e.g. |W| (inverse model) ↦ $W(X,Y,Z)$

$$RGB_{avg} = (R_{avg} + G_{avg} + B_{avg})/3$$

$$[N_R, N_G, N_B] = \left[\frac{RGB_{avg}}{R_{avg}}, \frac{RGB_{avg}}{G_{avg}}, \frac{RGB_{avg}}{B_{avg}}\right]$$

$$[R', G', B'] = [N_R, N_G, N_B] \cdot [R, G, B]$$

where $R, G, B$ are the red, green, and blue values of the original pixel, $R_{avg}, G_{avg}, B_{avg}$ are the average of each color over all pixels, and $R', G', B'$ are the color adjusted values.

$$k_B = \frac{.5 + RGB_{avg}}{2}$$

$$M = median(R_{avg}, G_{avg}, B_{avg})$$

and used to compute the dominant color coefficients $R_D, G_D, B_D$:

$$[R_D, G_D, B_D] = \left[\frac{R_{avg}}{M}, \frac{G_{avg}}{M}, \frac{B_{avg}}{M}\right]$$

In some embodiments, the dominant color coefficients $R_D, G_D, B_D$ may be scaled by a factor, $\alpha$ (e.g. $\alpha = 0.3$ for red dominant color, $\alpha = 0.5$ for blue).

$$[D_R, D_G, D_B] = [1,1,1] + \alpha([R_D - 1, G_D - 1, B_D - 1])$$

In some embodiments, the coefficients, $D_R, D_G, D_B$, may be used to perform the neutral color adjustment step.

$$[R', G', B'] = [D_R, D_G, D_B] \cdot [R, G, B]$$

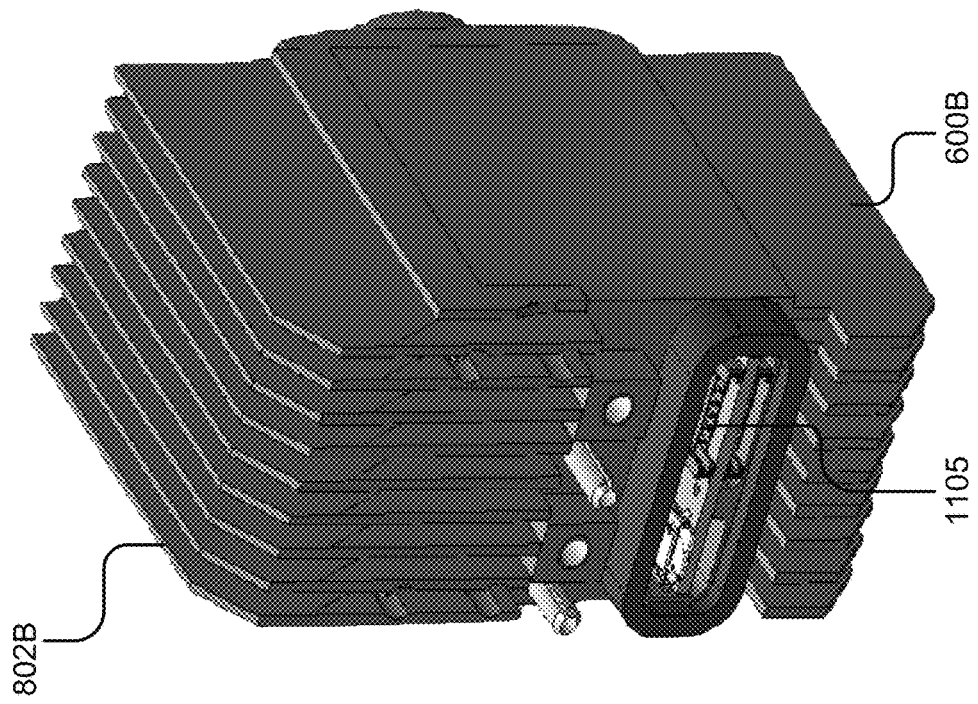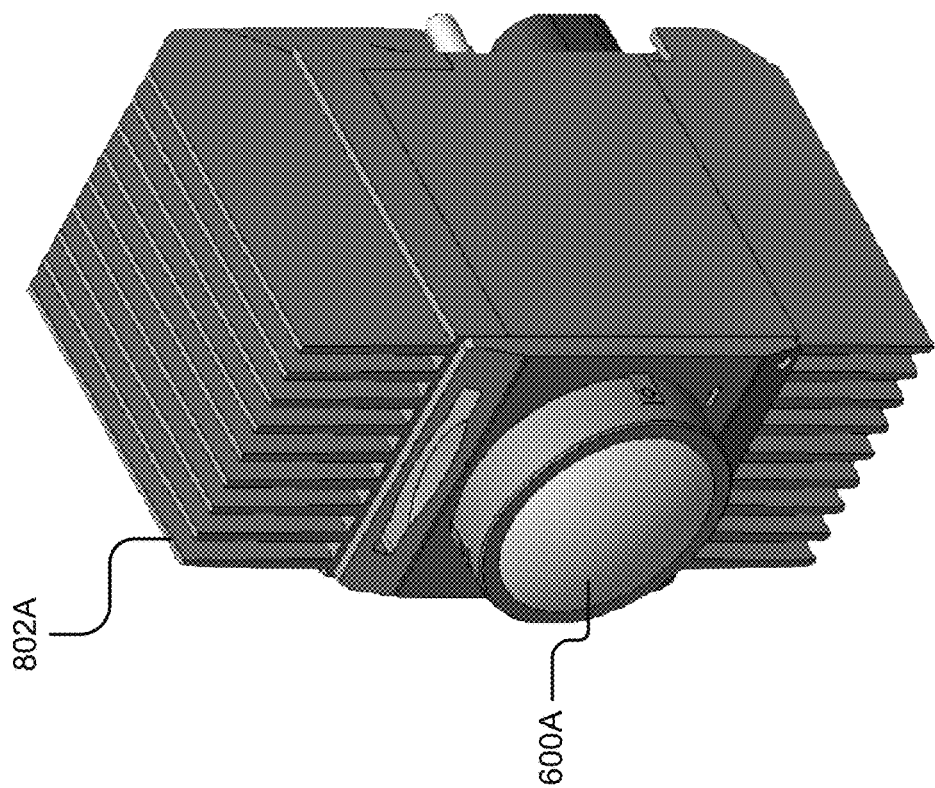
Figure 11

CAMERA ARRAY REMOVING LENS DISTORTION

CROSS-REFERENCE TO RELATED APPLICATIONS

This application is a continuation of U.S. Utility patent application Ser. No. 14/810,479, titled "Camera Array Removing Lens Distortion," filed Jul. 28, 2015, which is claims the benefit of U.S. Provisional Patent Application No. 62/029,254, titled "Virtual Presence," filed Jul. 25, 2014. This application is a continuation-in-part of U.S. Utility patent application Ser. No. 14/444,938, entitled "Camera Array Including Camera Modules" filed Jul. 28, 2014. In addition, this application is related to: U.S. Provisional Patent Application No. 62/004,645, entitled "Camera Array Including Camera Modules," filed May 29, 2014; U.S. Provisional Patent Application No. 62/008,215, titled "Color Consensus," filed Jun. 5, 2014; U.S. Utility patent application Ser. No. 14/465,575, entitled "Aggregating Images and Audio Data to Generate Virtual Reality Content" filed Aug. 21, 2014; and U.S. Utility patent application Ser. No. 14/465,570, entitled "Generating Content for a Virtual Reality System" filed Aug. 21, 2014. Each of the foregoing patent applications is herein incorporated in its entirety by reference.

FIELD

The embodiments discussed herein are related to a camera system. More particularly, the embodiments discussed herein relate to a camera system including one or more camera modules for recording images.

BACKGROUND

Existing camera systems using multiple cameras to record videos in different locations or the same location may generate videos with poor quality. For example, cameras in a security system may capture videos independently without considering synchronization between the different cameras. Each camera may operate independently from the other cameras with no coordination between the different cameras.

The subject matter claimed herein is not limited to embodiments that solve any disadvantages or that operate only in environments such as those described above. Rather, this background is only provided to illustrate one example technology area where some embodiments described herein may be practiced.

SUMMARY

According to one innovative aspect of the subject matter described in this disclosure, a camera system comprises a camera array. The camera modules comprise a master camera that includes a processor, a memory, a sensor, a lens, and a switch. The switch is configured to instruct each of the camera modules to initiate a start operation to start recording video data using the lens and the sensor in the other camera modules. The switch is configured to instruct each of the camera modules to initiate a stop operation to stop recording. Lens distortion effects may be removed from the frames described by the video data. The camera modules of the camera array are configured to provide a 3× field of view overlap.

In general, another innovative aspect of the subject matter described in this disclosure may be embodied in methods that include: housing forming apertures for the camera modules and wherein the camera modules comprise housing that is rotationally symmetrical; housing in the shape of a honeycomb, the center of each compartment of the honeycomb forming an aperture for one of the camera modules; a microphone array configured to capture audio for enabling reconstruction of sound from any arbitrary direction; an aggregation system for generating a stream of three-dimensional video and audio data for displaying panoramic images; a viewing system configured to decode and render the three-dimensional video and play the audio data on a virtual reality display and surround sound system; a connection hub linking the camera modules and configured to transfer the video data from at least one of the camera modules to a client device, the connection hub including a battery for supplying power to each of the camera modules.

These and other implementations may each optionally include one or more of the following operations and features. For instance, the features include: the camera modules forming a daisy chain with the master camera being coupled to a first camera module that is coupled to an "n" camera module that is coupled to the master camera; each camera module being positioned to have at least one overlapping field of view with another camera module; the status of one of the camera modules including a faulty status and the status indicator indicating the faulty status responsive to a fault occurring in one of the camera modules; the status indicator being an overall status indicator configured to indicate the faulty status of a fault occurring in any of the camera modules and wherein the camera modules further include individual status indicators configured to indicate the fault status of the fault occurring in one of the camera modules; the camera modules being synchronized through a daisy chain to capture corresponding video data in different directions simultaneously; wherein the camera modules pass control and status messages to one another via the daisy chain.

According to another innovative aspect of the subject matter described in this disclosure, a method comprises identifying, with one or more processors, a device identifier and a position of each camera module in a camera array, the camera modules including a master camera; confirming an absence of faults in the camera module; initiating a start operation in the master camera, the master camera instructing the other camera modules to start recording; receiving video data comprising image frames from the camera modules; stitching the image frames together based on the video data; generating three-dimensional video; synchronize audio data; and generating a stream of the three-dimensional video and the audio data for displaying panoramic images. In some embodiments, the method is further configured to perform geometric calibration to identify a relative position of each camera module. In some embodiments, the image frames are stitched together based on calibration relative position of each camera module. In some embodiments, the method is further configured to generate a user interface for viewing video data from one of the camera modules Other aspects include corresponding methods, systems, apparatus, and computer program products for these and other innovative aspects.

The disclosure is particularly advantageous in a number of respects. First, the camera array generates a realistic three-dimensional experience for users. Second, the camera modules are designed to be rotationally symmetrical with interchangeable components, which makes modifications easier to implement. Third, the aggregation system includes a user interface for allowing a user to view different levels of detail including a preview of the virtual reality experience, and the images from individual camera modules.

BRIEF DESCRIPTION OF THE DRAWINGS

Example embodiments will be described and explained with additional specificity and detail through the use of the accompanying drawings in which:

FIGS. 2B, 2C and 2D illustrate elements of a forward model for providing lens distortion correction according to some embodiments;

FIGS. 2E and 2F illustrate elements of an inverse model for providing lens distortion correction according to some embodiments;

FIG. 2G illustrates elements of forward and backward mapping for providing lens distortion correction according to some embodiments;

FIGS. 2I through 2L depict example elements that may be used by the correction module according to some embodiments;

FIG. 11 illustrates camera modules including heat dissipation elements.

DESCRIPTION OF EMBODIMENTS

Figure 1:
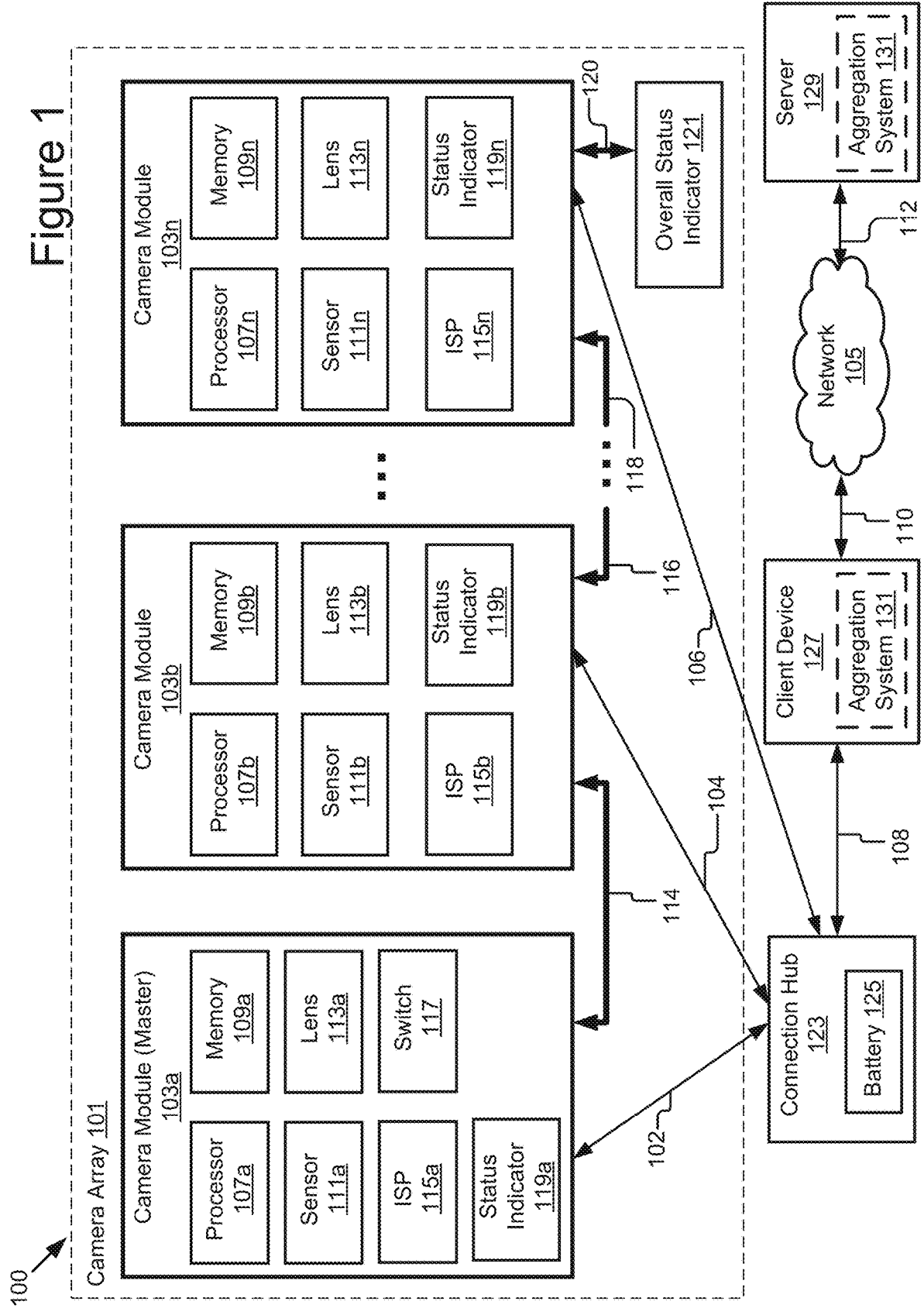
FIG. 1 illustrates a block diagram of some embodiments of an example camera system for recording video data using one or more camera modules.

The disclosure relates to a camera system that includes a camera array with one or more camera modules. Applications for the camera system may include, but are not limited to, a rear camera system for a vehicle, a robot installed with a camera array including one or more camera modules, a high-end filming tool, and other suitable applications with virtual presence. For example, one application of the camera system may include providing a virtual reality (VR) experience to users. An ideal virtual reality experience is one that creates a realistic sense of being in another place. Creating such an experience may involve reproducing three dimensional (3D) video for a scene. The disclosure may relate to a panoptic virtual presence system and method that is designed to create a realistic sense of being in another place by providing an immersive 3D viewing experience. Examples of 3D scenes that a user might enjoy experiencing include vacation spots, sporting events, a wedding, a conference, a press conference, confirming a location as part of mapping software, experiencing an underwater scene, experiencing a starling murmuration, scene changes that are accelerated with time-lapse photography, etc.

The camera system according to an example embodiment may include a camera array, a connection hub (e.g., a universal serial bus (USB) hub) coupled to the camera array, and a client device (e.g., a laptop computer) coupled to the connection hub. The camera array may include multiple camera modules configured to capture video data for the same object or the same scene from multiple angles at the same time. Each camera module may include a processor, a memory, a sensor, and a lens. The camera modules in the camera array may be coupled in a daisy chain for passing control and status messages to one another via the daisy chain and synchronizing timing of image frames captured by different camera modules. For example, the camera modules are synchronized to start and to stop recording video data at the same time so that image frames from the different camera modules are synchronized.

One of the camera modules in the camera array may be a master camera module that includes a switch (e.g., a micro switch) for controlling the operations of the camera modules. For example, a user may press the switch a first time to start recording video data simultaneously using all the camera modules in the camera array. The user may press the switch a second time to stop the recording of the video data.

In some embodiments, the camera array additionally includes an overall status indicator (e.g., a light-emitting diode (LED)) coupled to the last camera module in the daisy chain. The overall status indicator may indicate an overall status of the camera array. If all of the camera modules in the camera array are fault-free (e.g., all camera modules function properly), the overall status indicator indicates a normal status for the camera array. However, if a fault occurs to at least one of the camera modules, the overall status indicator indicates a faulty status for the camera array. Each camera module may additionally include a corresponding status indicator for indicating an individual status of the corresponding camera module. By utilizing the overall status indicator in the camera array and the respective status indicators in the camera modules, the overall status of the camera array and the individual statuses of the camera modules may be monitored at any time. For example, if a memory card in a camera module is full, both the overall status indicator and the individual status indicator corresponding to the camera module may indicate a faulty status, allowing a user operating the camera array to determine which camera module has a fault.

The camera array may be at least part of a modular camera system, with each camera forming a module of the modular camera system. The camera array has a flexible structure so that it is easy to remove a particular camera module from the camera array and to add new camera modules to the camera array. The camera modules in the camera array may be configured in different geometries. For example, the camera array includes multiple camera modules arranged in a line, a cylinder, a sphere, or another geometry. Each camera module may be configured to point to a different direction so that the camera array may capture an object or a scene from multiple directions at the same time.

The camera modules may be coupled to the connection hub for transferring video data captured by the camera modules to the client device via the connection hub. In some embodiments, the camera modules do not have built-in batteries, and the connection hub may include a battery for supplying power to the camera modules. The connection hub may be coupled to the client device for sending the video data to the client device.

The camera system described herein may include two types of communication mechanisms, including a first communication mechanism for data communication between the different camera modules (e.g., a bus for communication between the different camera modules) and a second communication mechanism for centrally controlling the operation of the camera modules (e.g., a control bus for controlling operations of the camera modules).

The camera system described herein may additionally include a set of algorithms for processing the video data captured by the camera array. The set of algorithms are stored on a non-transitory memory for converting the input across multiple camera modules into a single stream of 3D video (e.g., a single compressed stream of 3D video data). The set of algorithms may be implemented in one or more "modules" as described in more detail below with reference to FIG. 2A. For example, the set of algorithms includes color correction algorithms for smoothing and correcting colors in the video data. In another example, the set of algorithms may be implemented in software that stitches the video data from multiple cameras into two large-format, panoramic video streams for left and right eye viewing, and encodes and compresses the video using a standard MPEG format or other suitable encoding/compression format.

Embodiments described herein contemplate various additions, modifications, and/or omissions to the above-described panoptic virtual presence system, which has been described by way of example only. Accordingly, the above-described camera system should not be construed as limiting. For example, the camera system described with respect to FIG. 1 below may include additional and/or different components or functionality than described above without departing from the scope of the disclosure.

Embodiments of the specification will be explained with reference to the accompanying drawings.

FIG. 1 illustrates a block diagram of some embodiments of a camera system 100 arranged in accordance with at least one embodiment described herein. The illustrated system 100 includes a camera array 101, a connection hub 123, a client device 127, and a server 129. The client device 127 and the server 129 may be communicatively coupled via a network 105. Additions, modifications, or omissions may be made to the illustrated embodiment without departing from the scope of the disclosure, as will be appreciated in view of the disclosure.

While FIG. 1 illustrates one camera array 101, one connection hub 123, one client device 127, and one server 129, the disclosure applies to a system architecture having one or more camera arrays 101, one or more connection hubs 123, one or more client devices 127, and one or more servers 129. Furthermore, although FIG. 1 illustrates one network 105 coupled to the entities of the system 100, in practice one or more networks 105 may be connected to these entities and the one or more networks 105 may be of various and differing types.

In one embodiment, the system 100 includes a housing (not shown). The housing may be a single sheet of metal or other material with apertures where the camera modules 103 may be coupled to the camera array 101. In some embodiments, the housing may be water resistant or waterproof. Water resistant housing may be used outdoors during a rain storm without damaging the camera modules 103. Waterproof housing may be used for capturing video underwater. In some embodiments, waterproof housing also withstands pressure for capturing video deep underwater.

The housing may be constructed from a heat dissipating material that draws heat from the camera modules 103 for dissipation in the atmosphere. In some embodiments the camera modules 103 also including metal housing to create a path for the heat to exit the camera array 101. Other devices for aiding in heat dissipation within the system 100 are possible, for example, the system 100 may include tubing for running water throughout the system to cool the components of the system 100. Other examples may include a silent fan for blowing hot air out of the system 100, heat sinks, and heat dissipating putty. Yet another example is to include slits in the housing for passive air cooling. In some embodiments, the heat dissipating materials are selected based on their absence of noise so that they avoid interfering with the audio recording. Another way to improve heat dissipation is to configure the greatest heat producing components of the camera array to be as close to the surface as possible. For example, the ISP 115 in the camera module 103 may be located along the edge of the camera module 103.

In some embodiments, the system 100 includes a temperature sensor for determining the temperature of the camera array 101. In some embodiments, the temperature sensor is communicatively coupled to the heat dissipating material and instructs the heat dissipating material to respond to temperature changes. For example, when the temperature exceeds a certain threshold, the temperature sensor instructs the fan to blow harder. In some other embodiments, the temperature sensor is communicatively coupled to the master camera module 103a and instructs the heat dissipating material based on information from the master camera module 103a. For example, the temperature sensor instructs less water to run through tubing where the video recording is using a time lapse sequence and therefore produces less heat than streaming video. In another example, where the video is recording in high power states, the temperature sensor instructs the heat dissipating materials to dissipate more heat. In yet another example, the temperature sensor instructs the heat dissipating materials to more aggressively dissipate heat when the scene being filmed is poorly illuminated, and image sensor noise is more apparent.

The camera array 101 may be a modular camera system configured to capture raw video data including image frames. In the illustrated embodiment shown in FIG. 1, the camera array 101 includes camera modules 103a, 103b . . . 103n (also referred to individually and collectively herein as camera module 103). While three camera modules 103a, 103b, 103n are illustrated in FIG. 1, the camera array 101 may include any number of camera modules 103. The camera array 101 may be constructed using individual cameras with each camera module 103.

The camera array 101 may be constructed using various configurations. For example, the camera modules 103a, 103b . . . 103n in the camera array 101 may be configured in different geometries (e.g., a sphere, a line, a cylinder, a cone, a cube, etc.) with the corresponding lenses 113 facing in different directions. For example, the camera modules 103 are positioned within the camera array 101 in a honeycomb pattern where each of the compartments form an aperture where a camera module 103 may be inserted. In another example, the camera array 101 includes multiple lenses along a horizontal axis and a smaller number of lenses on a vertical axis.

In some embodiments, the camera modules 103a, 103b . . . 103n in the camera array 101 are oriented around a sphere in different directions with sufficient diameter and field-of-view to capture enough view disparity to render stereoscopic images. In another example, the camera array 101 may comprise 32 Point Grey Blackfly Gigabit Ethernet cameras distributed around a 20 centimeter diameter sphere. Camera models that are different from the Point Grey Blackfly camera model may be included in the camera array 101. For example, in some embodiments the camera array 101 comprises a sphere whose exterior surface is covered in one or more optical sensors configured to render 3D images or video. The optical sensors may be communicatively coupled to a controller. The entire exterior surface of the sphere may be covered in optical sensors configured to render 3D images or video.

The camera array 101 has a flexible structure so that a particular camera module 103 may be removed from the camera array 101 easily. In some embodiments, the camera modules 103 are rotationally symmetrical such that a camera module 103 may be inserted into the housing, removed, rotated 90 degrees, and reinserted into the housing. In this example, the sides of the housing may be equidistant, such as a camera module 103 with four equidistant sides. This allows for a landscape orientation or a portrait orientation of the image frames without changing the base. In some embodiments, the lenses 113 and the camera modules 103 are interchangeable. New camera modules 103 may also be added to the camera array 101. In some embodiments, the camera modules 103 are connected to the camera array 101 via USB connectors.

In some embodiments, the camera modules 103 in the camera array 101 are positioned to have a sufficient field-of-view overlap so that all objects can be seen by more than one view point. In some embodiments, having the camera array 101 configured so that an object may be viewed by more than one camera may be beneficial for correcting exposure or color deficiencies in the images captured by the camera array 101. Other benefits include disparity/depth calculations, stereoscopic reconstruction, and the potential to perform multi-camera high-dynamic range (HDR) imaging using an alternating mosaic pattern of under- and over-exposure across the camera array.

In some embodiments, the camera array 101 may also include a microphone array (not shown in FIG. 1) for capturing sound from all directions. For example, the microphone array may include a Core Sound Tetramic soundfield tetrahedral microphone array following the principles of ambisonics, enabling reconstruction of sound from any arbitrary direction. In another example, the microphone array includes the Eigenmike, which advantageously includes a greater number of microphones and, as a result, can perform higher-order (i.e. more spatially accurate) ambisonics. The microphone may be mounted to the top of the camera array 101, be positioned between camera modules 103, or be positioned within the body of the camera array 101.

In some embodiments, the camera modules 103 in the camera array 101 do not include built-in batteries so that the sizes of the camera modules 103 are more compact. The camera modules 103 may obtain power from a battery 125 that is part of the connection hub 123.

In some implementations, the connection hub does not include a battery 125 and power is supplied by a different power source. For example, one or more of a wall outlet, generator, power inventor or any combination of these elements provides power for a load such as the camera modules 103. The power source may be alternating current ("AC") or direct current ("DC"). In some implementations, the power source may be an AC power supply that is converted to a DC power supply. For example, AC voltage from a generator or wall outlet is routed through a power inventor to provide DC voltage for the camera modules 103. The power source may also include a power step down element to refine the power supply to a voltage level compatible with one or more loads. For AC voltage, the power step down element may include one or more step-down transformers or any other element or combination of elements configured to step down AC voltage. For DC voltage, the power step down element may include one or more series voltage dropping resistors, a voltage divider network or any other element or combination of elements configured to step down DC voltage. For example, AC voltage from a generator or wall outlet is routed through a power inventor to provide DC voltage, and this DC voltage is routed through one or more series voltage dropping resistors to drop the DC voltage to a level appropriate for powering the camera modules.

In some embodiments, the external cases of the camera modules 103 may be made of heat-transferring materials such as metal so that the heat in the camera modules 103 may be dissipated more efficiently than using other materials. In some embodiments, each camera module 103 may include a heat dissipation element. Examples of heat dissipation elements include, but are not limited to, heat sinks, fans, and heat dissipating putty.

As illustrated in FIG. 1, the camera module 103a includes a processor 107a, a memory 109a, a sensor 111a, a lens 113a, an ISP 115a, a switch 117, and a status indicator 119a.

The processor 107a may include an arithmetic logic unit, a microprocessor, a general purpose controller or some other processor array to perform computations and provide electronic display signals to a display device. The processor 107a may process data signals and may include various computing architectures including a complex instruction set computer (CISC) architecture, a reduced instruction set computer (RISC) architecture, or an architecture implementing a combination of instruction sets. Although a single processor is illustrated in the camera module 103a, the camera module 103a may include multiple processors.

The memory 109a includes a non-transitory memory that stores data for providing the functionality described herein. The memory 109a may be a dynamic random access memory (DRAM) device, a static random access memory (SRAM) device, flash memory or some other memory devices. In some embodiments, the memory 109a may include one or more camera memory cards for storing raw video data (e.g., image frames) captured by the camera module 103a. Example memory cards include, but are not limited to, a secure digital (SD) memory card, a secure digital high capacity (SDHC) memory card, a secure digital extra capacity (SDXC) memory card, and a compact flash (CF) memory card, etc.

The sensor 111a is any device that senses physical changes. For example, the sensor 111a may be a device that converts an optical image to electrical signals. For example, the sensor 111 captures light and converts the captured light into an electrical signal. Example sensors 111a include, but are not limited to, semiconductor charge-coupled devices (CCD), active pixel sensors in complementary metal-oxide-semiconductor (CMOS), and N-type metal-oxide-semiconductor (NMOS, Live MOS), etc. Other example sensors 111a are possible.

In some embodiments, the sensor 111a may include a depth sensor. In some embodiments, the depth sensor determines depth using structured light, such as a speckle pattern of infrared laser light. For example, the depth sensor may include the PrimeSense depth sensor. In another embodiment, the depth sensor determines depth using or time-of-flight technology that determines depth based on the time it takes a light signal to travel between the camera and a subject. The depth sensor may be used to determine a depth map.

In one embodiment, the sensor 111a is a motion detector. For example, the sensor 111a is a gyroscope that measures orientation of the camera module 103a. In another example, the sensor 111a is an accelerometer that is used to measure acceleration of the camera module 103a. In yet another example, the sensor 111a includes location detection, such as a global positioning system (GPS), location detection through triangulation via a wireless network, etc.

In another embodiment, the sensor 111a includes a microphone for recording audio. Even if the camera array 101 has a separate microphone, including a microphone in each camera module 103 may be valuable for generating 3D audio to play with the 3D video.

The lens 113a may be an optical device capable of transmitting and refracting lights and converging or diverging a beam of light. For example, the lens 113a may be a camera lens.

The image signal processor (ISP) 115a receives an electrical signal from the sensor 111a and performs demosaicing to determine pixel color from the electrical signals. In some embodiments, the ISP controls autofocus, exposure, and white balance. In some embodiments, the ISP 115a compresses raw video data for faster transmission. In some other embodiments, the raw video data is compressed by the aggregation system 131. The ISP embeds device identifier of the camera module 103 (e.g. the serial number) in the raw video data. The ISP 115a may be interchangeable.

In some embodiments, the ISP 115a generates a metadata log associated with each frame that includes attributes associated with the image frame and any image processing performed on the image file. For example, the metadata file includes what kind of exposure and color processing was used.

The switch 117 may be a device for controlling an operation of the camera module 103a. For example, the switch 117 includes a micro-switch or a button used to control a start operation and a stop operation of the camera module 103a. The switch 117 may be exterior to the camera module 103a and activated by a user. In another embodiment, the switch 117 is inside the camera module 103a.

In some implementations, the switch 117 is controlled wirelessly. For example, the switch 117 may be controlled via dedicated short-range communication ("DSRC"), wireless fidelity ("WiFi"), Bluetooth™ or any other wireless communication protocol. In some implementations, the switch 117 is a tangible hardware device. In other implementations, the switch 117 is code and routines stored on a tangible, non-transitory memory and executed by one or more processors. For example, the switch 117 may be code and routines that are stored on a tangible, non-transitory memory and controlled by a processor-based computing device via a wired or wireless communicative coupling. The tangible, non-transitory memory that stores the code and routines of the switch 117 may or may not be an element of the processor-based computing device that controls the switch 117 via a wired or wireless communicative coupling.

As described below in more detail, the camera module 103a may be a master camera module of the camera array 101 and may control operations of other camera modules 103 in the same camera array 101. For example, an initiation of a start operation in the camera module 103a may also cause an initiation of a start operation in other camera modules 103 so that all the camera modules 103 in the camera array 101 are synchronized to start recording raw video data at the same time, respectively. An initiation of a stop operation in the camera module 103a may also cause an initiation of a stop operation in other camera modules 103 so that all the camera modules 103 in the camera array 101 may be synchronized to stop recording video data at the same time, respectively.

As a result, the switch 117 not only controls the operation of the camera module 103a, but also simultaneously controls operations of other camera modules 103 in the camera array 101. For example, a user may press the switch 117 a first time to start recording video data using the camera modules 103 in the camera array 101. The user may press the switch 117 a second time to stop recording video data using the camera array 101.

The status indicator 119a may be a device configured to indicate a status of the camera module 103a. A status of the camera module 103a may be one of a normal status and a faulty status. For example, the status indicator 119a indicates a normal status of the camera module 103a if the camera module 103a functions properly. However, the status indicator 119a may indicate a faulty status of the camera module 103a if a fault occurs at the camera module 103a. For example, if the storage space in the memory 109a is full, indicating no more video data captured by the camera module 103a may be stored in the memory 109a, the status indicator 119a may indicate a faulty status showing that a fault occurs at the camera module 103a. The status indicator may also indicate other statuses, for example indicating the camera is booting up or shutting down.

In some embodiments, the status indicator 119a may include a light-emitting diode (LED). The LED may emit light if the status indicator 119a indicates a normal status. Alternatively, the LED may not emit light if the status indicator 119a indicates a faulty status. In some embodiments, the LED may emit multiple colors of light or emit light at different rates in order to indicate different statuses.

The camera module 103b includes a processor 107b, a memory 109b, a sensor 111b, a lens 113b, and a status indicator 119b. The camera module 103n includes a processor 107n, a memory 109n, a sensor 111n, a lens 113n, and a status indicator 119n. The processors 107b and 107n are similar to the processor 107a, the memories 109b and 109n are similar to the memory 109a, the sensors 111b and 111n are similar to the sensor 111a, the lenses 113b and 113n are similar to the lens 113a, and the status indicators 119b and 119n are similar to the status indicator 119a. The description will not be repeated herein.

The camera modules 103a, 103b . . . 103n in the camera array 101 may form a daisy chain in which the camera modules 103a, 103b . . . 103n are connected in sequence. For example, camera module 103a is connected to camera module 103b, which is connected to camera module 103n, which completes the ring by being connected to camera module 103a. As described below in more detail, the camera modules 103a, 103b . . . 103n in the camera array 101 are synchronized through the daisy chain. One camera module 103 (e.g., the first camera module 103*a*) in the daisy chain may be configured as a master camera module that allows the camera array 101 to act as one entity by controlling clock signals for other camera modules in the camera array 101. The clock signals may be used to synchronize operations of the camera modules 103 in the camera array 101. The master camera module includes a switch for controlling operations of the master camera module as well as operations of other camera modules 103 in the same camera array 101. For example, as illustrated in FIG. 1, the camera module 103*a* is a master camera module including the switch 117 for controlling operations of the camera modules in the camera array 101. In another embodiment, the camera modules perform bidirectional communication.

The master camera module 103*a* is connected to the camera module 103*b* via a signal line 114 for controlling a start operation or a stop operation of the camera module 103*b*. For example, when the camera module 103*a* starts to record video data, a clock signal may be transmitted to the camera module 103*b* via the signal line 114, causing the camera module 103*a* and the camera module 103*b* to start recording video data at the same time, respectively. When the camera module 103*a* stops recording video data, no clock signal is transmitted to the camera module 103*b*, causing the camera module 103*a* and the camera module 103*b* to stop recording video data at the same time, respectively.

In one embodiment, the master camera module 103*a* communicates with camera module 103*b* directly via signal line 114. In another embodiment, the master camera module 103*a* communicates with a connection hub 123 that is connected to a client device 127, such as a laptop, which communicates the instructions back through the connection hub 123 to the camera module 103*b*.

The camera module 103*b* is connected to a next camera module 103 in the daisy chain via a signal line 116 for supplying a clock signal from the camera module 103*b* to the next camera module 103, so that operations of the next camera module 103 is synchronized with the camera module 103*b* by the clock signal. The camera module 103*n* is connected to a preceding camera module 103 in the daisy chain via a signal line 118 for obtaining a clock signal from the preceding camera module 103, so that operation of the camera module 103*n* is synchronized with the preceding camera module 103 by the clock signal.

As a result, operations (e.g., the start operations, the stop operations) of the camera modules 103*a*, 103*b* . . . 103*n* in the camera array 101 are synchronized, and the image frames in the respective video data captured by the camera modules 103*a*, 103*b* . . . 103*n* are also synchronized. An initiation of a start operation (or a stop operation) in the master camera module 103*a* may simultaneously cause an initiation of a start operation (or a stop operation) of all the other camera modules 103 in the camera array 101. Thus, the daisy chain formed by the camera modules 103*a*, 103*b* . . . 103*b* may be configured to synchronize start operations and stop operations of the camera modules 103*a*, 103*b* . . . 103*n*, causing image frames captured by the camera modules 103*a*, 103*b* . . . 103*n* to be synchronized. The clock signals in the camera modules 103*a*, 103*b* . . . 103*n* may have a frequency of 60 Hz so that the camera modules 103*a*, 103*b* . . . 103*n* in the camera array 101 capture 60 image frames per second, respectively.

In some embodiments, an overall status indicator 121 may be connected to one of the camera modules 103 to indicate a status of at least one of the camera modules 103 or an overall status of the camera array 101. This may also be referred to as heartbeat monitoring. For example, the overall status indicator 121 may be connected to the camera module 103*n* via a signal line 120. A clock signal may be supplied to the overall status indicator 121 from the camera module 103*n*. An overall status of the camera array 101 may be one of a normal status and a faulty status. For example, if all the camera modules 103 in the camera array 101 are fault-free, the overall status indicator 121 indicates a normal status for the camera array 101.

However, if a fault occurs to at least one of the camera modules 103 in the camera array 101, the overall status indicator 121 indicates a faulty status for the camera array 101. For example, assume that the camera module 103*b* malfunctioned because it overheated or the memory card was full. The status indicator 119*b* in the camera module 103*b* may indicate a faulty status for the camera module 103*b*, and the overall status indicator 121 may indicate an overall faulty status for the camera array 101. By using the combination of the status indicators 119 and the overall status indicator 121, the overall status of the camera array 101 and the individual status of the camera modules 103 may be monitored at any time. In some embodiments, the overall status indicator 121 and the individual status indicators 119 are part of a single display.

In some embodiments, the overall status indicator 121 performs enumeration. For example, the overall status indicator 121 counts the number of camera modules 103 that are available in the camera array 101.

The camera modules 103 may be coupled to the connection hub 123. For example, the camera module 103*a* is communicatively coupled to the connection hub 123 via a signal line 102. The camera module 103*b* is communicatively coupled to the connection hub 123 via a signal line 104. The camera module 103*n* is communicatively coupled to the connection hub 123 via a signal line 106. Each of the signal lines 102, 104, and 106 may represent a wired connection (e.g., a USB cable, an Ethernet cable, a HDMI cable, a RCA cable, Firewire, CameraLink, Thunderbolt or custom bus to transmit video data) or a wireless connection (e.g., wireless fidelity (Wi-Fi), Bluetooth, etc.).

The connection hub 123 may receive and aggregate streams of raw video data describing image frames from the respective camera modules 103. The raw video data may be compressed. In some embodiments, the connection hub 123 includes a memory card or other non-transitory memory where the raw video data is stored. The connection hub 123 may then transfer the raw video data to the client device 127. In some examples, the connection hub 123 may be a USB hub. In some embodiments, the raw video data is streamed through the connection hub to the client device 127. In other examples, a user may manually remove the memory card from the hub 123 and extract the raw video data from the memory card to the client device 127.

In some embodiments, the connection hub 123 includes one or more batteries 125 for supplying power to the camera modules 103 in the camera array 101. Alternatively or additionally, one or more batteries 125 may be coupled to the connection hub 123 for providing power to the camera modules 103.

The client device 127 may be a processor-based computing device. For example, the client device 127 may be a personal computer, laptop, tablet computing device, smartphone, set top box, network-enabled television or any other processor based computing device. In the illustrated embodiment, the client device 127 is coupled to the connection hub 123 via a signal line 108. In some embodiments, the client device 127 includes network functionality and is communicatively coupled to the network 105 via a signal line 110. The client device 127 may be configured to transmit data to the server 129 or receive data from the server 129 via the network 105. In some embodiments, the client device 127 includes an aggregation system 131 for aggregating raw video data captured by the camera modules 103 to form 3D video data. Alternatively or additionally, the aggregation system 131 may be operable on the server 129.

The aggregation system 131 may include a set of code and routines that, when executed by a processor, aggregate raw video data (e.g., image frames) received from the camera modules 103 to form 3D video data. The aggregation system 131 may be configured to process the raw video data to generate a compressed stream of 3D video data. In some embodiments, the compressed stream of 3D video may include one or more packets. The 3D video data may be configured for playback on a VR display or another suitable display. The 3D video data may describe a stereoscopic panorama of a scene.

As described below with reference to FIG. 2A, the aggregation system 131 includes a video and audio module 208. The video and audio module 208 may generate the 3D video data based on raw video data received from the camera modules 103 in the camera array 101. The camera array 101 may include multiple camera modules 103 to capture video data or images of a scene from multiple directions or views, roughly covering an entire 360 degree sphere in some embodiments. The various views provide enough view disparity for the video and audio module 208 to generate and render stereoscopic images. In these and other embodiments, the video and audio module 208 may include a stitching algorithm for stitching images together to form a 3D panorama described by the 3D video data. For example, the video and audio module 208 may stitch the video from multiple cameras into two large-format, panoramic video streams for left and right eye viewing.

In some embodiments, the aggregation system 131 includes code and routines configured to filter the video data to improve its quality. The aggregation system 131 may also include code and routines to intentionally change the appearance of the video with a video effect. The aggregation system 131 is described in more detail below with reference to FIG. 2A. In some embodiments, the aggregation system 131 includes algorithms for processing sound from the microphone associated with the camera array 101 and/or the microphones associated with the camera modules 103 to generate 3D audio data.

The server 129 may be a hardware server that includes a processor, a memory, and network communication capabilities. In the illustrated implementation, the server 129 is coupled to the network 105 via a signal line 112. The server 129 sends and receives data to and from one or more of the other entities of system 100 via the network 105. For example, the server 129 receives 3D video data (or compressed 3D video data) from the client device 127 and stores the 3D video data in a storage associated with the server 129. In some embodiments, the server 129 includes the aggregation system 131 for receiving raw video data from the client device 127 and aggregating the raw video data to create 3D video data.

The network 105 may be a conventional type, wired or wireless, and may have numerous different configurations including a star configuration, token ring configuration or other configurations. Furthermore, the network 105 may include a local area network (LAN), a wide area network (WAN) (e.g., the Internet), or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 may include Bluetooth communication networks or a cellular communications network for sending and receiving data including via short messaging service (SMS), multimedia messaging service (MMS), hypertext transfer protocol (HTTP), direct data connection, WAP, email, etc.

In some embodiments, the system 100 may additionally include a viewing system (not shown). The viewing system decodes and renders the video on a VR display, adjusting the output as a user changes head orientation. The viewing system may include or use a computer to decode and render the video onto the Oculus Rift VR display or other suitable VR display.

Figure 2A:
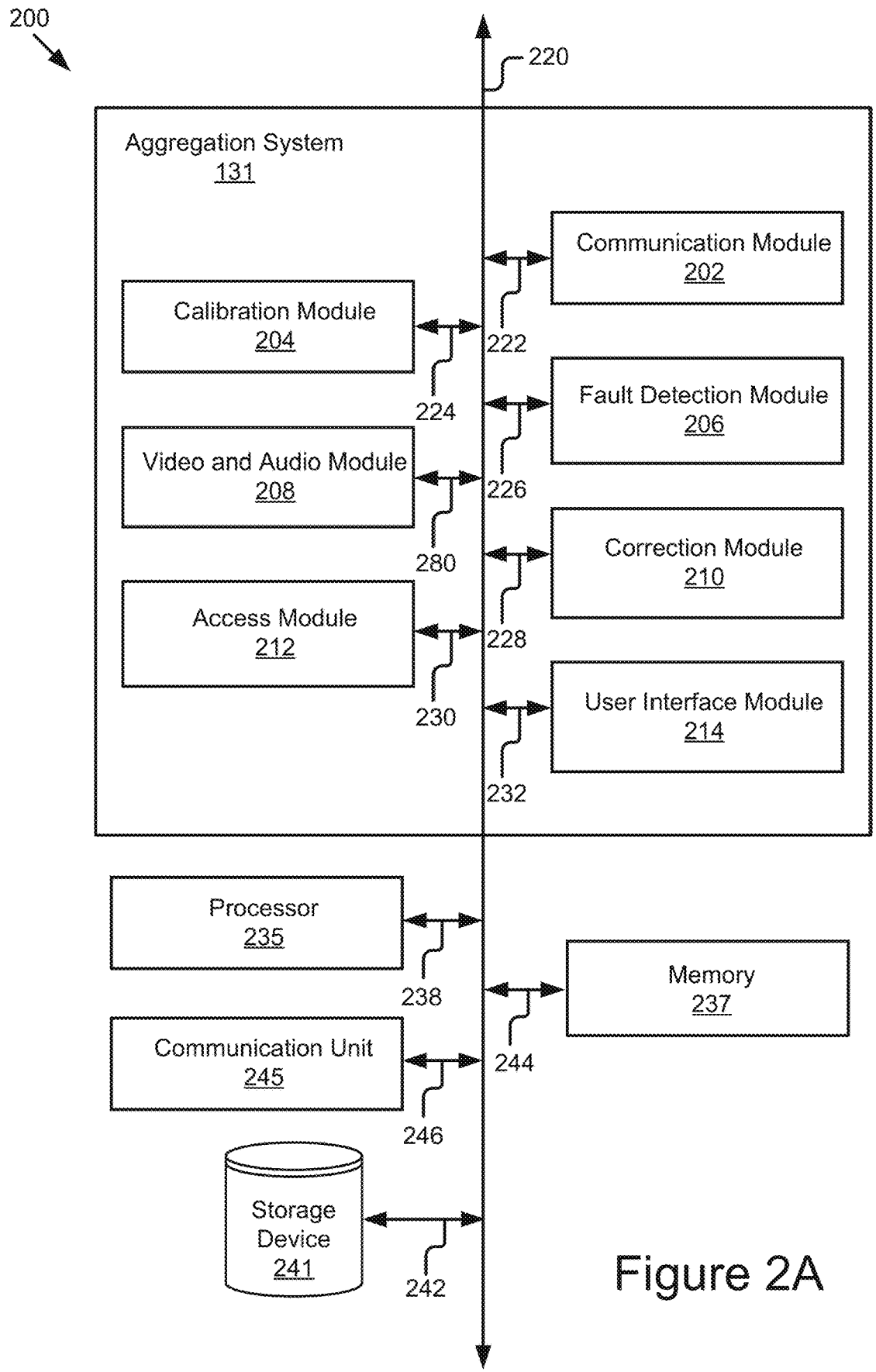
FIG. 2A illustrates a block diagram of some embodiments of an example aggregation system.

Referring now to FIG. 2A, an example of the aggregation system 131 is illustrated in accordance with at least one embodiment described herein. FIG. 2A is a block diagram of a computing device 200 that includes the aggregation system 131, a memory 237, a processor 235, a communication unit 245, and a storage device 241. The components of the computing device 200 are communicatively coupled by a bus 220. In some embodiments, the computing device 200 may be one of a client device 127, a server 129, or another computing device.

The processor 235 may include an arithmetic logic unit, a microprocessor, a general purpose controller or some other processor array to perform computations and provide electronic display signals to a display device. The processor 235 is coupled to the bus 220 for communication with the other components via a signal line 238. The processor 235 may process data signals and may include various computing architectures including a complex instruction set computer (CISC) architecture, a reduced instruction set computer (RISC) architecture, or an architecture implementing a combination of instruction sets. Although FIG. 2A includes a single processor 235, multiple processors may be included. Other processors, operating systems, sensors, displays and physical configurations may be possible.

The memory 237 includes a non-transitory memory that stores data for providing the functionality described herein. The memory 237 may be a dynamic random access memory (DRAM) device, a static random access memory (SRAM) device, flash memory or some other memory devices. In some embodiments, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The memory 237 may store the code, routines and data necessary for the aggregation system 131 to provide its functionality. The memory 237 is coupled to the bus 220 via a signal line 244.

The communication unit 245 may transmit data to any of the entities that comprise the system 100 depicted in FIG. 1. Similarly, the communication unit 245 may receive data from any of the entities that comprise the system 100 depicted in FIG. 1. The communication unit 245 is coupled to the bus 220 via a signal line 246. In some embodiments, the communication unit 245 includes a port for direct physical connection to a network, such as a network 105 of FIG. 1 or to another communication channel. For example, the communication unit 245 may include a port such as a USB, SD, RJ45 or similar port for wired communication with a client device. In some embodiments, the communication unit 245 includes a wireless transceiver for exchanging data with the client device or other communication channels using one or more wireless communication methods, including IEEE 802.11, IEEE 802.16, BLUETOOTH® or another suitable wireless communication method.

In some embodiments, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some embodiments, the communication unit 245 includes a wired port and a wireless transceiver. The communication unit 245 also provides other conventional connections to a network for distribution of data using standard network protocols including TCP/IP, HTTP, HTTPS and SMTP, etc.

The storage device 241 can be a non-transitory storage medium that stores data for providing the functionality described herein. The storage device 241 may be a dynamic random access memory (DRAM) device, a static random access memory (SRAM) device, flash memory, or some other memory devices. In some embodiments, the storage device 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The storage device 241 is communicatively coupled to the bus 220 via a signal line 242. In some embodiments, the storage device 241 may store data that was temporarily stored in the memory 237.

In the implementation illustrated in FIG. 2A, the aggregation system 131 includes a communication module 202, a calibration module 204, a fault detection module 206, a video and audio module 208, a correction module 210, an access module 212, and a user interface module 214. These components of the aggregation system 131 are communicatively coupled to each other via the bus 220.

The communication module 202 can be software including routines for handling communications between the aggregation system 131 and other components of the computing device 200. In some embodiments, the communication module 202 can be a set of instructions executable by the processor 235 to provide the functionality described below for handling communications between the aggregation system 131 and other components of the computing device 200. In some embodiments, the communication module 202 can be stored in the memory 237 of the computing device 200 and can be accessible and executable by the processor 235. The communication module 202 may be adapted for cooperation and communication with the processor 235 and other components of the computing device 200 via a signal line 222.

The communication module 202 sends and receives data, via the communication unit 245, to and from one or more of the connection hub 123, the client device 127, and the server 129 depending upon where the aggregation system 131 may be stored. For example, the communication module 202 receives, via the communication unit 245, raw video data from the connection hub 123 and sends the raw video data to the video and audio module 208. In another example, the communication module 202 receives instructions from the video and audio module 208 for starting and stopping the camera modules 103 that the communication module 202 transmits to the switch 117.

In some embodiments, the communication module 202 receives data from components of the aggregation system 131 and stores the data in one or more of the storage device 241 and the memory 237. In some embodiments, the communication module 202 retrieves data from the storage device 241 or the memory 237 and sends the data to one or more components of the aggregation system 131. In some embodiments, the communication module 202 may handle communications between components of the aggregation system 131. For example, the communication module 202 receives 3D video data after color correction from the correction module 210 and sends the 3D video data to the access module 212.

The calibration module 204 can be software including routines for calibrating the camera array 101. In some embodiments, the calibration module 204 can be a set of instructions executable by the processor 235 to provide the functionality described below for calibrating the camera array 101. In some embodiments, the calibration module 204 can be stored in the memory 237 of the computing device 200 and can be accessible and executable by the processor 235. The calibration module 204 may be adapted for cooperation and communication with the processor 235 and other components of the computing device 200 via a signal line 224.

In some embodiments, the calibration module 204 may be configured to identify a device identifier for each camera module 103 in the camera array 101 and perform geometric calibration to identify a relative position of each camera module 103 in the camera array 101. The device identifier may include a device or lens serial number that is part of a video file. The calibration module 204 performs geometric calibration to correct for slight variations due to mechanical tolerances in production and during mounting. For example, the camera modules 103 may include slight variations in camera orientation due to human error occurring when installing or manufacturing the camera modules 115 in the camera array 101. In some embodiments, the calibration module 204 performs geometric calibration by receiving information about recorded calibrated target images using a special rig and adjusts values accordingly. In some other embodiments, the calibration module 204 performs geometric calibration after the video is recorded using the video content.

In some embodiments, the calibration module 204 may receive inputs about external markers (e.g. the coordinates of external markers) and calibrate the camera modules 103 based on the inputs. The calibration module 204 may analyze the images captured by each camera module 103, determine the errors present in the images and determine calibration factors used to calibrate the corresponding camera module 103. The calibration factors may include data used to automatically modify the images captured by the corresponding camera module 115 so that the images include fewer errors. In some embodiments, the calibration factors are applied to the images by the calibration module 204 so that the images include no errors that are detectable during user consumption of the 3D video content. For example, the calibration module 204 may detect the deficiencies in the images caused by the calibration errors. The calibration module 204 may determine one or more pixels associated with the deficiencies. The calibration module 204 may determine the pixel values associated with these pixels and then modify the pixel values using the calibration factors so that the deficiencies are corrected.

In some embodiments, the calibration module 204 receives a configuration files with information about camera lens distortion that is determined by an external calibration box.

In some embodiments, the calibration factors may also be provided to an administrator of the camera array 101 who uses the calibration factors to manually correct the calibration deficiencies of the camera modules 103 in the camera array 101. In some other embodiments, position and rotational offset are saved for each camera module 103 in a storage file.

The fault detection module 206 can be software including routines for detecting a faulty camera module 103 in the camera array 101. In some embodiments, the fault detection module 206 can be a set of instructions executable by the processor 235 to provide the functionality described below for detecting a faulty camera module 103 in the camera array 101. In some embodiments, the fault detection module 206 can be stored in the memory 237 of the computing device 200 and can be accessible and executable by the processor 235. The fault detection module 206 may be adapted for cooperation and communication with the processor 235 and other components of the computing device 200 via a signal line 226.

The fault detection module 206 monitors an overall status of the camera array 101 using the overall status indicator 121. The overall status indicator 121 may indicate the overall status of the camera array 101 as a normal status if all the camera modules 103 function properly. Alternatively, the overall status indicator 121 may indicate the overall status of the camera array 101 as a faulty status if a fault occurs to at least one camera module 103. If the overall status indicates a fault has occurred, the fault detection module 206 determines respective individual statuses of the camera modules 103 using the respective status indicators 119. The fault detection module 206 determines a status indicator 119 associated with a faulty status. The fault detection module 206 determines a camera module 103 associated with the status indicator 119 that has the faulty status as a faulty camera module. For example, if the memory 109*b* in the camera module 103*b* is full, both the overall status indicator 121 and the status indicator 119*b* may indicate a faulty status. Thus, the fault detection module 206 determines the camera module 103*b* as a faulty camera module. If the fault detection module 206 determines an absence of faults, the video and audio module 208 may instruct the camera modules 103 to begin recording.

The video and audio module 208 can be software including routines for generating 3D video, synthesizing audio data, and generating a stream of 3D video and audio data. In some embodiments, the video and audio module 208 can be a set of instructions executable by the processor 235 to provide the functionality described below for generating a stream of 3D video and audio data. In some embodiments, the video and audio module 208 can be stored in the memory 237 of the computing device 200 and can be accessible and executable by the processor 235. The video and audio module 208 may be adapted for cooperation and communication with the processor 235 and other components of the computing device 200 via a signal line 280.

In some embodiments, the video and audio module 208 receives an indication from the fault detection module 206 of an absence of faults in the camera array 101. The video and audio module 208 then instructs the master camera module to start recording. The video and audio module 208 receives raw video data describing image frames from the camera modules 103. At some point, the video and audio module 208 initiates a stop operation in the master camera module. For example, the video and audio module 208 initiates the stop operation in response to a manual input from a user, an expiration of time according to the clock, etc.

The video and audio module 208 may generate the 3D video data based on the raw video data received from the camera modules 103. For example, the video and audio module 208 may stitch the image frames together based on a frame sync signal in the video and by using audio tracks from a mounted microphone and/or microphones in each camera module 103 to time-align audio tracks from the microphones. In some embodiments, the stitching is also based on the geometric calibration. The video and audio module 208 may include a stitching algorithm for stitching images captured by the camera modules 103 together to form a 3D panorama described by the 3D video data. For example, the video module 208 may stitch the raw video data from multiple cameras into two large-format, panoramic video streams for left and right eye viewing.

The video and audio module 208 receives audio from multiple microphones and synthesizes audio based on timing associated with the audio tracks to generate 3D audio data that changes based on the user's head position. In some embodiments, the video and audio module 208 mixes audio from a 3D ambisonic microphone with spot microphones to create fully spatialized sound effects. The video and audio module 208 generates binaural audio. In some embodiments, the video and audio module 208 uses a head-related transfer function to generate real-time binaural audio. In some embodiments, the audio is compatible with Dolby® Atmos™. In some embodiments, the video and audio module 208 generates a stream of 3D and audio data for displaying panoramic images.

In some embodiments, the video and audio module 208 may construct a stereoscopic panorama using images from multiple views from different directions. For example, the camera array 101 includes multiple camera modules 103 with multiple lenses 113 arranged around all three hundred and sixty degrees of a sphere. The lenses 113 each point in different directions. Because the camera modules 103 are arranged around three hundred and sixty degrees of a sphere and taking images of the scene from multiple viewpoints, the video data includes multiple views from different directions. The resulting panoramic image is a spherical representation of the scene. Each pixel in the panorama may represent a view in a slightly different direction relative to neighboring pixels.

In some embodiments, the video and audio module 208 generates the stereoscopic panorama based on the location of the camera modules 103. For example, where the camera modules 103 are daisy chained to each other and the master camera module instructs the other camera modules 103 to start recording, the video and audio module 208 uses the timestamp associated with the recordings to construct the stereoscopic panorama.

The correction module 210 can be software including routines for detecting and correcting exposure or color deficiencies in the images captured by the camera modules 103. In some embodiments, the correction module 210 can be a set of instructions executable by the processor 235 to provide the functionality described below for detecting and correction exposure or color deficiencies in the images captured by the camera modules 103. In some embodiments, the correction module 210 can be stored in the memory 237 of the computing device 200 and can be accessible and executable by the processor 235. The correction module 210 may be adapted for cooperation and communication with the processor 235 and other components of the computing device 200 via a signal line 228.

For example, because the lenses 113 of the camera modules 103 are pointing in different directions, the lighting and color conditions may vary dramatically. If all the lenses 113 of the camera modules 103 are configured identically some images may be under or over exposed. The correction module 210 may detect the exposure or color deficiencies. The correction module 210 may determine one or more pixels associated with the exposure or color deficiencies. The correction module 210 may determine the pixel values associated with these pixels and then modify the pixel values so that the exposure or color deficiencies are not detectable by a user during consumption of the 3D video content using a client device. In some embodiments, the camera modules 103 have overlapping fields of view and, exposure or color deficiencies in the images captured by the camera modules 103 can be corrected or auto-corrected using this overlap. In other embodiments, exposure or color deficiencies in the images captured by the camera modules 103 may be corrected using calibration based on color charts of known values.

In some embodiments, the correction module 210 may include software including routines for providing lens distortion correction. Lens distortion correction may include detecting and removing one or more optical aberrations from an ideal rectilinear projection. Lens distortion correction may beneficially counter or remove a barrel or pincushion effect in the images captured by the camera array 101 (or the camera array 900 described below with reference to FIG. 9). The barrel or pincushion effect causes straight lines from a scene depicted in the images to appear curved in the lensed image. The lens distortion correction provided by the correction module 210 may include code and routines configured to correct other distortion effects similar to the barrel or pincushion effect.

The correction module 210 may include code and routines configured to provide lens distortion correction at the corner or edges of an image. The corners or edges of the image maybe the location in the image where optical aberrations are strongest or most detectable by a human viewing the image.

In some embodiments, the correction module 210 may provide lens distortion correction prior to the images described by the video data being stitched together since the edges are used to stitch an image to a bordering image when creating a panorama (by the video and audio module 208). For example, the fault detection module 206 may include code and routines configured to detect one or more optical aberrations in the images described by the video data. The fault detection module 206 may detect one or more optical aberrations in one or more images and transmit a signal to the correction module 210 describing the one or more optical aberrations and identifying the one or more images included in the video data which included the one or more optical aberrations. The fault detection module 206 may identify the images included the optical aberrations and provide lens distortion correction to remove one or more lens distortion effects (e.g., one or more barrel or pincushion effects) present in the one or more images. For example, the fault detection module 206 may modify the video data to remove one or more lens distortion effects present in one or more of the images described by the video data.

The fault detection module 206 or the correction module 210 may identify and remove the one or more lens distortion effects using one or more of the following: (1) a forward model; (2) an inverse model; and (3) forward and backward mapping. The forward model, inverse model, and forward and backward mapping may include a five-parameter model. The five-parameter model may describe one or more radial or linear lens imperfections present in one or more lenses 113 of a camera array 101 or 900. The five-parameter model may remove unwanted optical distortions present in one or more images described by the video data. The model may be described by five lens distortion parameters: k1; k2; k3; k4; and k5. These five lens distortion parameters are known to those having ordinary skill in the art of lens distortion or optics.

In some embodiments, the forward model may be used by the fault detection module 206 or the correction module 210 to map a three dimensional real world point onto an undistorted two dimensional image. In some embodiments, the inverse model may be used by the fault detection module 206 or the correction module 210 to map the three dimensional real word point from the undistorted two dimensional image to a three dimensional image given a particular distance.

An embodiment of the forward model is described below with reference to FIGS. 2B, 2C and 2D. An embodiment of the inverse model is described below with reference to FIG. 2E. An embodiment of forward and backward mapping is described below with reference to FIG. 2F.

In some embodiments, the optical aberrations of an image may be associated with the camera module 103 which captured the image. Camera modules 103 which were manufactured in the same manufacturing lot may share similar optical aberrations. However, in some embodiments the optical aberrations at the corners or edges of the image may vary with statistical significance even among camera modules 103 manufactured in the same manufacturing lot.

The access module 212 can be software including routines for providing access to 3D video data. In some embodiments, the access module 212 can be a set of instructions executable by the processor 235 to provide the functionality described below for providing access to 3D video data. In some embodiments, the access module 212 can be stored in the memory 237 of the computing device 200 and can be accessible and executable by the processor 235. The access module 212 may be adapted for cooperation and communication with the processor 235 and other components of the computing device 200 via a signal line 230.

In some embodiments, the access module 212 stores the 3D video data received from the video and audio module 208 or the correction module 210 in the storage device 241. The access module 212 allows a user to access the 3D video data in response to receiving an access request from the user. In some embodiments, the access module 212 sends the 3D video data to a viewing system configured for viewing the 3D data, allowing a user to view the 3D video data from the viewing system. In some other embodiments, the access module 212 sends the 3D video data to the server 129, allowing users to access the 3D video data from the server 129 via the network 105.

The user interface module 214 can be software including routines for generating graphical data for providing user interfaces. In some implementations, the user interface module 214 can be a set of instructions executable by the processor 235 to provide the functionality described below for generating graphical data for providing user interfaces.

The user interface module 214 may be adapted for cooperation and communication with the processor 235 and other components of the computing device 200 via a signal line 232.

In some embodiments, the user interface module 214 generates a user interface for the user of the client device 127 to specify when to start a recording operation and when to stop a recording operation. In some embodiments, the user interface includes information about memory management, white balance, color temperature, gain, ISO, filters, clock, file name, wireless fidelity (WiFi), temperature, power consumption, serial numbers, a preview of the video stream, and the video being recorded by one or more of the camera modules 103. The user may be able to modify some of the settings, such as the ISO, color temperature, white balance, filters, clock, file name, etc. In some other embodiments, the user interface module 214 generates information about the overall status indicator 121 and the individual status indicators 119. For example, the user interface module 214 generates a notification for the user about which of the camera modules 103 is experiencing a problem. In some embodiments, the notification includes specific information about the problem, such as an overheated camera, full disk space, etc.

In one embodiment, one or more of the systems 100, 200 may include hardware and the memory 237 may include code and routines configured to provide some or all of the following functionality: a watchdog timer to cause the camera array 101 to stop recording and notify the master camera 103a of an error if the watchdog timer elapses; error logging to save a log file on an SD card that includes a description of all detected faults; a state memory to save settings such as record settings, filenames, pre-set exposure, white balance gains, etc. on power down of the camera array 101 and to reload these settings on the next boot; a debug mode to enable debugging of the camera array over USB; a metadata stream to record, for each frame, one or more of a global timecode, a temperature log, an analog gain, a digital gain, integration time and white balance gains; recording the metadata stream to a log file saved on an SD card; recording the metadata stream as a component of the video data; functionality to boot from a NAND flash; functionality to update firmware for the system 200 from an SD card; functionality to check if a camera module 103 is a master or slave and set signal chains accordingly; for the master camera module 103a, a hardware push button or switch which initiates setup of the master camera module 103a and its associated slave camera modules 103b, 103n; a hardware push button or switch that initiates a signal controlled by the master camera module 103a which initiates recording of video data by the camera array 101; a hardware push button or switch that places one or more of the systems 100, 200 in standby mode (or causes the systems 100, 200 to exit standby mode); a real time clock (RTC) configured to set system time; synchronization of system time with the clock of the client device 127; synchronization of time from the master camera module 103a to the slave camera modules 103b, 103n; synchronization of system to the RTC; functionality to enable adjustment of white balance or exposure settings on each camera module 103; functionality to format the SD card, check status of each camera module 103, set recording name or identifier to be associated with the video data or a portion of the video data; functionality to place one or more of the camera modules 103 in a lower power state; functionality to read the serial numbers of all camera and save a log of the serial numbers which may be stored on the memory 237; functionality to enable recording of thumbnail videos; and a camera-to-camera messaging protocol.

The camera-to-camera messaging protocol may be provided via one or more upstream universal asynchronous receiver/transmitter (UART) devices or modules. The camera-to-camera messaging protocol may provide some or all of the following functionality: enabling enumeration of camera modules 103; synchronization of heartbeats among master camera modules 103a and slave camera modules 103b, 103n; notification of errors or faults from the slave camera modules 103b, 103n to the master camera modules 103a; and enable a user to set the status of a camera module 103 as a master or slave. In one embodiment, the camera-to-camera messaging protocol may also beneficially enable the user to set one or more of the following: timestamps for portions of the video data; filenames for portions of the video data; exposure settings for one or more camera modules 103; white balance settings for one or more camera modules 103; and a recording mode for one or more of the camera modules 103 (e.g., time-lapse recording, regular recording, etc.).

In one embodiment, one or more of the systems 100, 200 may include hardware and the memory 237 may include code and routines configured to enable the client device 127 to request a preview of a recording. For example, a user may be a director of a movie who needs to know whether the last recording captured the desired attributes for a movie scene. The director may interact with the client device 127 to request a frame of the recorded video be captured and downloaded from the camera array 101 to the client device 127 so that the user may view the frame on a display of the client device 127 to determine if the frame includes the desired attributes. The frame may be referred to as a preview frame.

Referring now to FIGS. 2B, 2C and 2D, illustrated are elements of a forward model for providing lens distortion correction according to some embodiments. In some embodiments, the forward model may be used by the fault detection module 206 or the correction module 210 to map a three dimensional real world point onto an undistorted two-dimensional image. For the purpose of clarity, the description provided below refers to the correction module 210 as using the forward model.

A sensor 111 of a camera module 103 captures a three-dimensional point V. The three dimensional point V may be defined by X, Y and Z coordinates.

In some embodiments, the three-dimensional point V may be captured by a sensor of the camera modules of the camera array 900 described below with reference to FIG. 9. This is true of all descriptions provided for FIGS. 2B through 2G.

The correction module 210 may include code and routines configured to determine a length of V by calculating a Euclidean norm. Element 299 includes an equation that may be used by the correction module 210 to determine the Euclidean norm, where |V| is the Euclidean norm.

The correction module 210 may include code and routines configured to normalize V. Element 298 includes an equation that may be used by the correction module 210 to normalize V, where $V_N$ is a normalized three-dimensional point.

The correction module 210 may include code and routines configured to determine the angle of the normalized three-dimensional point. Element 297 includes an equation that may be used by the correction module 210 to determine the angle of the three-dimensional point, where α is the angle and $v_{X,Y,Z}$ is a unit vector in (x, y, z) direction, respectively.

Referring now to FIG. 2C. The correction module 210 may include code and routines configured to determine an undistorted distance to an optical center of a lens of a camera module. The camera module may be the camera module which captured the image.

Element 296 includes an equation that may be used by the correction module 210 to determine the undistorted distance, where d is the undistorted distance.

Element 295 may include an equation that may be used by the correction module 210 to determine the undistorted distance d when the lens distortion parameter k3 equals zero.

Element 294 may include an equation that may be used by the correction module 210 the undistorted distance d when lens distortion parameters k2 and k3 equal zero while the lens distortion parameter k1 is not equal to zero.

Referring now to FIG. 2D. Element 293 includes equations that may be used by the correction module 210 to determine the (x, y) coordinates of the two-dimensional point. The two-dimensional point defined by (x, y) may describe the mapping of the three dimensional point V (described above with reference to FIG. 2B) onto a two-dimensional image. Equations 293 through 299 described above may be included in the forward model. In this way, the forward model may be used by the correction module 210 to map a three dimensional real world point V onto an undistorted two-dimensional image, wherein the point (x, y) may describe a version of V mapped onto the two-dimensional image.

Referring now to FIGS. 2E and 2F, illustrated are elements of an inverse model for providing lens distortion correction according to some embodiments. In some embodiments, the inverse model may be used by the fault detection module 206 or the correction module 210 to map the three dimensional real word point from the undistorted two dimensional image to a three dimensional image given a particular distance. For the purpose of clarity, the description provided below refers to the correction module 210 as using the inverse model.

The correction module 210 may include code and routines configured to use the inverse model to transform a two-dimensional coordinate from an acquired image (described by the video data) given a distance, dist, into real world three-dimensional coordinates.

For example, the correction module 210 may use one or more of the equations included in element 292 to determine a vector V as depicted in element 292. The length of vector V (or three-dimensional point V) may be determined using the Euclidian norm, IVI.

Referring now to FIG. 2F. The correction module 210 may include code and routines configured to normalize V to determine the length of V. Element 291 includes a equation that may be used by the correction module to normalize V.

The correction module 210 may include code and routines configured to determine a three-dimensional point W in world coordinates given a distance dist between the object depicted in the image to the lens of the camera module. Element 290 includes an equation that may be used to determine the three-dimensional point W in world coordinates.

Referring now to FIG. 2G, illustrated are elements of forward and backward mapping for providing lens distortion correction according to some embodiments. In some embodiments, the forward and backward mapping may be used by the fault detection module 206 or the correction module 210 to provide aspects of lens distortion correction. For the purpose of clarity, the description provided below refers to the correction module 210 as using the elements of forward mapping and backward mapping.

The forward mapping and the backward mapping may summarize and embodiment of using the forward model and the inverse model.

The forward mapping may described by element 289. The forward mapping may include elements of the forward model. For example, where the term "(forward model)" is included in the forward mapping, the forward model of elements 299 through 293 may be used by the correction model 210.

The backward mapping may described by element 289. The forward mapping may include elements of the forward model. For example, where the term "(inverse model)" is included the backward mapping, the inverse model of elements 292 through 288 may be used by the correction model 210.

Multi-Camera Geometric Calibration

The following are example elements of multi-camera geometric calibration according to some embodiments. Multi-camera geometric calibration may include the process of determining the relative position of multiple cameras (or camera modules) with respect to each other. Multi-camera geometric calibration may be implemented by an element of the aggregation system 131 such as the calibration module 204. For example, the calibration module 204 may include code and routines configured to provide multi-camera geometric calibration as described herein.

Figure 2H:
FIG. 2H depicts an equation for camera module calibration according to some embodiments.

In some embodiments, multi-camera geometric calibration includes a step to reduce or eliminate stitching artifacts. In some embodiments, the stitching artifacts may be due to misalignment of one or more of the camera modules when combining the images included in the video data to form a stitched set of images which form a panorama. In some embodiments, a position of a camera module may be described by a rotation vector in three-dimensional space R and a translation offset T. Referring to FIG. 2H, element 287 depicts an example of a determination of the position of N number of camera modules (or cameras).

In some embodiments, if a camera pair included in the camera array (e.g. referring to FIG. 2H, camera #1 and camera #2) can see the same points in three-dimensional space with known positions, the relative position from cameras can be determined with respect to each other. In some embodiments, one or more of the known three-dimensional points may be seen by at least two cameras included in the camera array.

In some embodiments, multiple calibration targets with known geometric properties (e.g. printed checkerboard patterns, circular targets, etc.) at various distances may be recorded by a camera array that rotates around the center (or approximate center) of the camera array using, for example, a stepper motor to provide a rotation speed. In some embodiments, the rotation speed may be constant or approximately constant. In some embodiments, the rotation speed is 1-10 degrees per second. In some embodiments, the rotation speed is 2 degrees per second.

In some embodiments, three-dimensional world coordinates may be determined from a known pattern. For example, three-dimensional world coordinates may be determined by checkerboard features by frame-wise extraction of the frame-synchronized recordings of each individual camera module (or camera) included in the camera array.

In some embodiments, assuming either a perfect distortionless lens or a lens with a known and calibrated distortion model, the error between the corresponding points in three-dimensional space of a camera pair may be reduced or minimized with one or more optimization schemes. An example optimization scheme may include Euclidian error norm of two three-dimensional points.

Multi-Camera Automatic White Balance

White balancing may include a process of applying a global color transformation to an image so that objects appear to be the same color in the image and in the real world. Since the response of human eyes is different than the response of a camera sensor, varying lighting conditions cause objects in an image to appear unnatural (e.g., yellow clouds on a sunny day).

In some embodiments, the aggregation system 131 includes code and routines configured to provide multi-camera automatic white balancing for the video data captured by the camera array. For example, the aggregation system 131 includes code and routines configured to preform one or more of the following steps: camera selection; natural color adjustment; brightness adjustment; dominant color detection; and adjustment fusion. In some embodiments, the correction module 210 may include code and routines configured to provide the multi-camera automatic white balancing.

Camera Selection

The first step in multi-camera white balancing is to determine which camera views can be reliably used in the algorithm.

Scenes which are not well illuminated may lead to noisy data and potentially poor color transformations. Low illumination scenes may be detected by using the upward/skyward-facing camera modules of the camera array (e.g., elements 708 in FIG. 9). The average pixel intensity of these camera modules is calculated by the correction module 210 and denoted as $I_{top-avg}$. If $I_{top-avg}$ is below some threshold $I_{min}$, then the correction module 210 determines that the scene is considered too dark. In this case, only video data from a chosen camera module is considered valid. Typically, the front-facing camera module is chosen because the main object of interest will be in this view and probably well-illuminated. However, another camera module may be chosen (e.g., camera view with the highest average pixel intensity) by the correction module 210.

Scenes where the color distribution or lighting condition varies depending on the direction (e.g., a concert with different colored lights) may also lead to potential problems. Color distribution and illumination variation is detected by the correction module 210 calculating the mean value of the red, green, and blue pixels and by analyzing the illumination channel in each camera view of each camera module. The mean and standard deviation of the red, green, and blue pixels across all camera modules included in the camera array is also calculated. If the mean value for each image channel (e.g., RGB or YUV) differs from mean over all camera modules by more than a certain threshold (e.g., twice the standard deviation), then the correction module 210 determines that the camera view is considered invalid.

Natural Color Adjustment

The first adjustment step in the multi-camera algorithm provided by the correction module 210 generates a color transform such that the average red, green, and blue pixel values over all selected camera modules is the same. Increasing the number of selected cameras improves the robustness of this portion of the algorithm due to the increase in sample size. The standard algorithm is depicted by FIG. 2I.

The algorithm also calculates separate color transforms for each camera, i.e., a different $[N_R, N_G, N_B]$ for each camera module. Then, the algorithm detects camera modules which are outliers by checking to see if any of the transforms are outliers. Consider $N_{arrow}=[N_R, N_G, N_B]$ to be a vector in three-dimensional space. $N_{arrow}$ is determined to be an outlier by the correction module 210 if the Euclidean distance between $N_{arrow}$ and the average transform vector (or the transform vector of the front-facing camera) is greater than some threshold. The video data associated with the corresponding camera modules can be thrown out so as not to affect the final calculation.

Brightness Adjustment

The correction module 210 may determine that images are too dark or too bright due to under/over exposure. However, some images are dark because the scene itself is dark. To differentiate between these two cases, the correction module 210 computes the mean intensity value of the pixels in the upward facing cameras, denoted as $I_{top-avg}$. If $I_{top-avg}$ is below some threshold, then the scene itself is dark and no brightness adjustment is applied.

However, if $I_{top-avg}$ above some threshold, then there is enough light in the scene such that the skyward-facing cameras are exposed correctly. In this case, the correction module 210 deals with under/over exposure by two methods: contrast adjustment and average brightness adjustment.

Contrast adjustment stretches the histogram of pixel intensity values such that a small percentage (e.g., 5%) of the brightest and darkest pixels are clipped and the rest of the pixels fill the entire representable range of intensities.

Average brightness adjustment scales all pixel values such that the average pixel intensity is close to the middle of the representable intensity range (e.g., 0.5 if the intensity range is [0,1]). The resulting average brightness is an interpolated point (e.g., half way between the original average brightness and the middle of the representable intensity range).

Figure 2J:
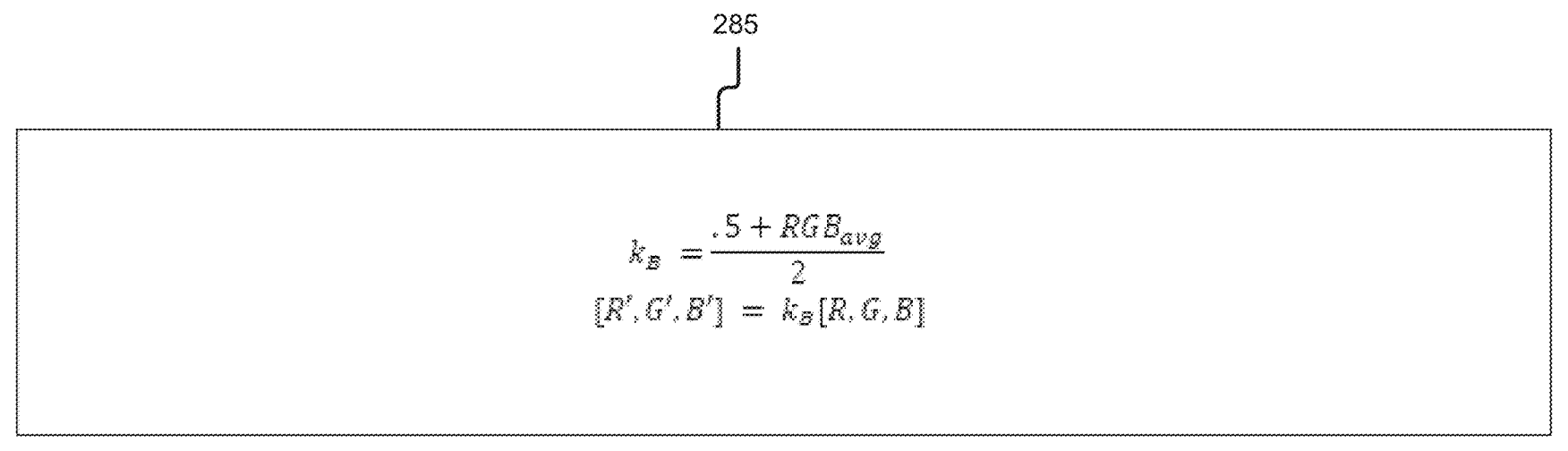

Referring to FIG. 2J, element 285 includes an equation that may be used by the correction module 210 to provide brightness adjustment.

Dominant Color Detection

The correction module 210 uses the two skyward-facing cameras to detect whether a dominant color exists. The dominant color is determined by determining the maximum value of $R_{avg}$, $G_{avg}$, $B_{avg}$, which denote the average red, green, and blue pixel values of the top camera modules of the camera array, respectively. Then, the median M is calculated over $R_{avg}$, $G_{avg}$, $B_{avg}$. The correction module 210 may use one or more of the equations depicted as element 284 in FIG. 2K.

Adjustment Fusion

Figure 2L:
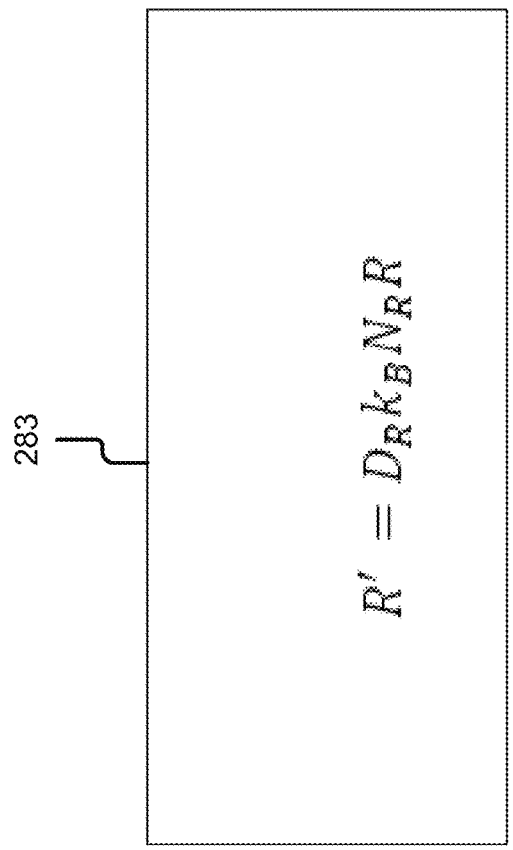

The overall color adjustment is the multiplication of each of the previous transformations. The output and input pixel values for the red color channel. Element 283 of FIG. 2L includes an equation that may be used by the correction module 210 to provide adjustment fusion.

Figure 3A:
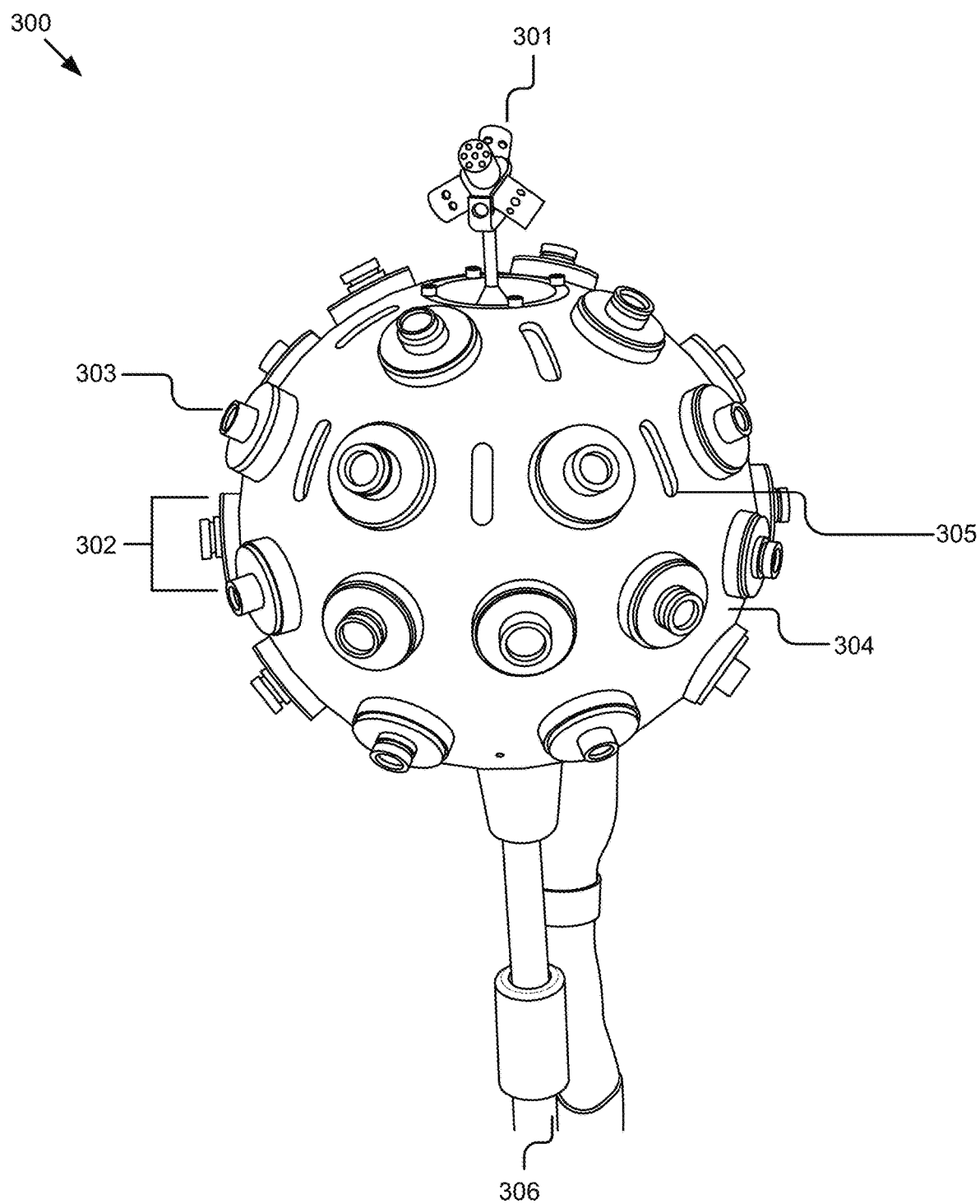
FIG. 3A illustrates an example system comprising a camera array and a connection hub according to some embodiments.

Referring now to FIG. 3A, an example system 300 comprising a camera array 101 and connection hub 123 are illustrated. In this example, the camera array 101 comprises a microphone array 301 and a spherical body for the camera modules 302. The camera modules 302 are illustrated as having a disc containing the lens 303 that couples to the housing 304. The housing includes several slits 305 for venting heat from inside the camera array 101. The camera array 101 is coupled to a connection hub 306 that includes multiple cables for transmitting the raw video data to a client device 127 (not shown).

Figure 3B:
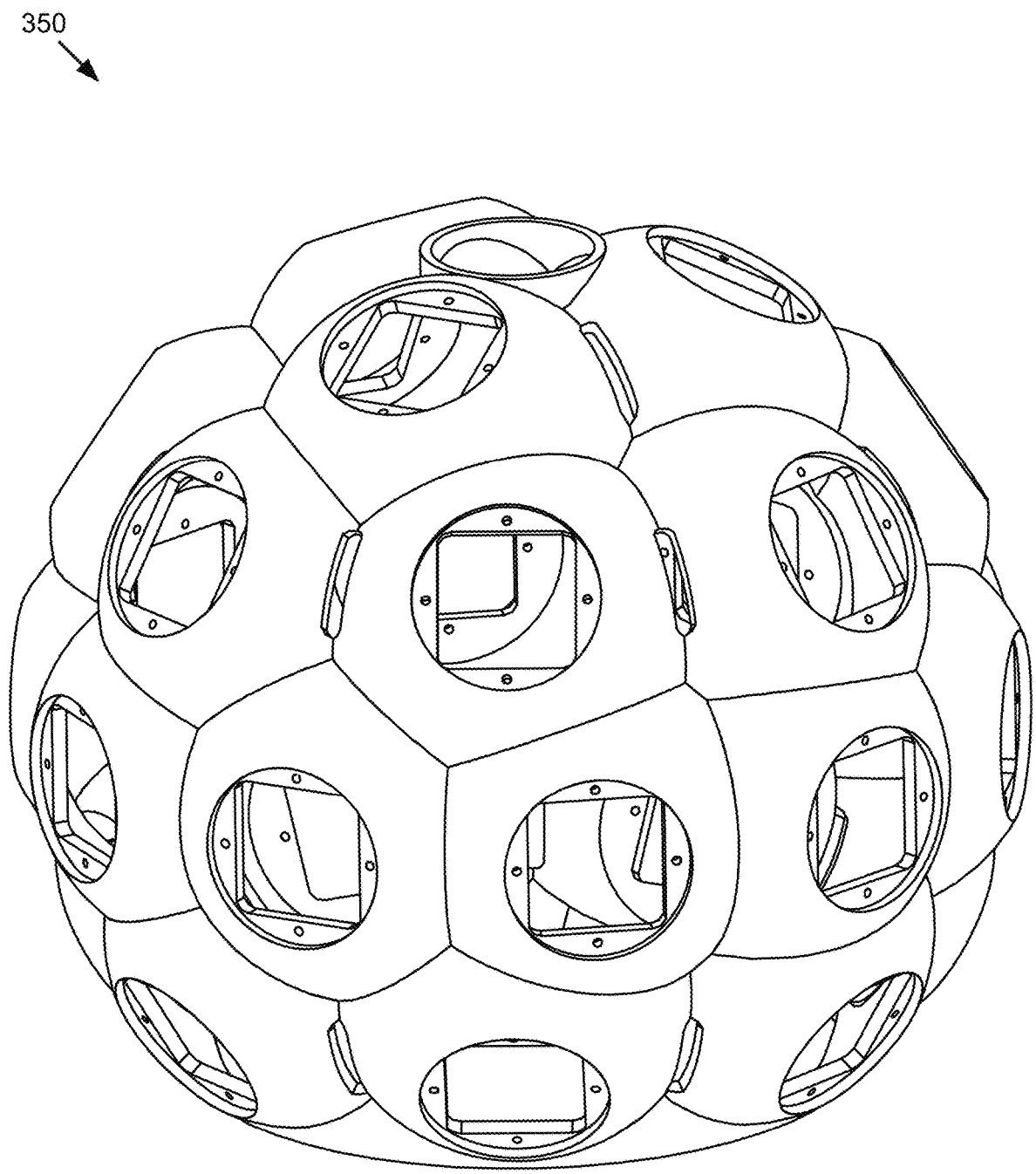
FIG. 3B illustrates an example housing according to some embodiments.

FIG. 3B illustrates an example housing 350 that is designed to look like a spherical honeycomb. The housing 350 includes apertures for the camera modules 103. In this example, the aperture includes disc space for the lens and rectangular housing with substantially equidistant sides for the body of the camera modules 103. The rectangular space allows camera modules 103 to be inserted into the rectangular space, removed, rotated 90 degrees, and reinserted into the rectangular space. In some embodiments, the camera modules 103 are physically mounted in the housing with screws to avoid extreme positional changes (e.g. camera rig geometry changes) over time.

Figure 3C:
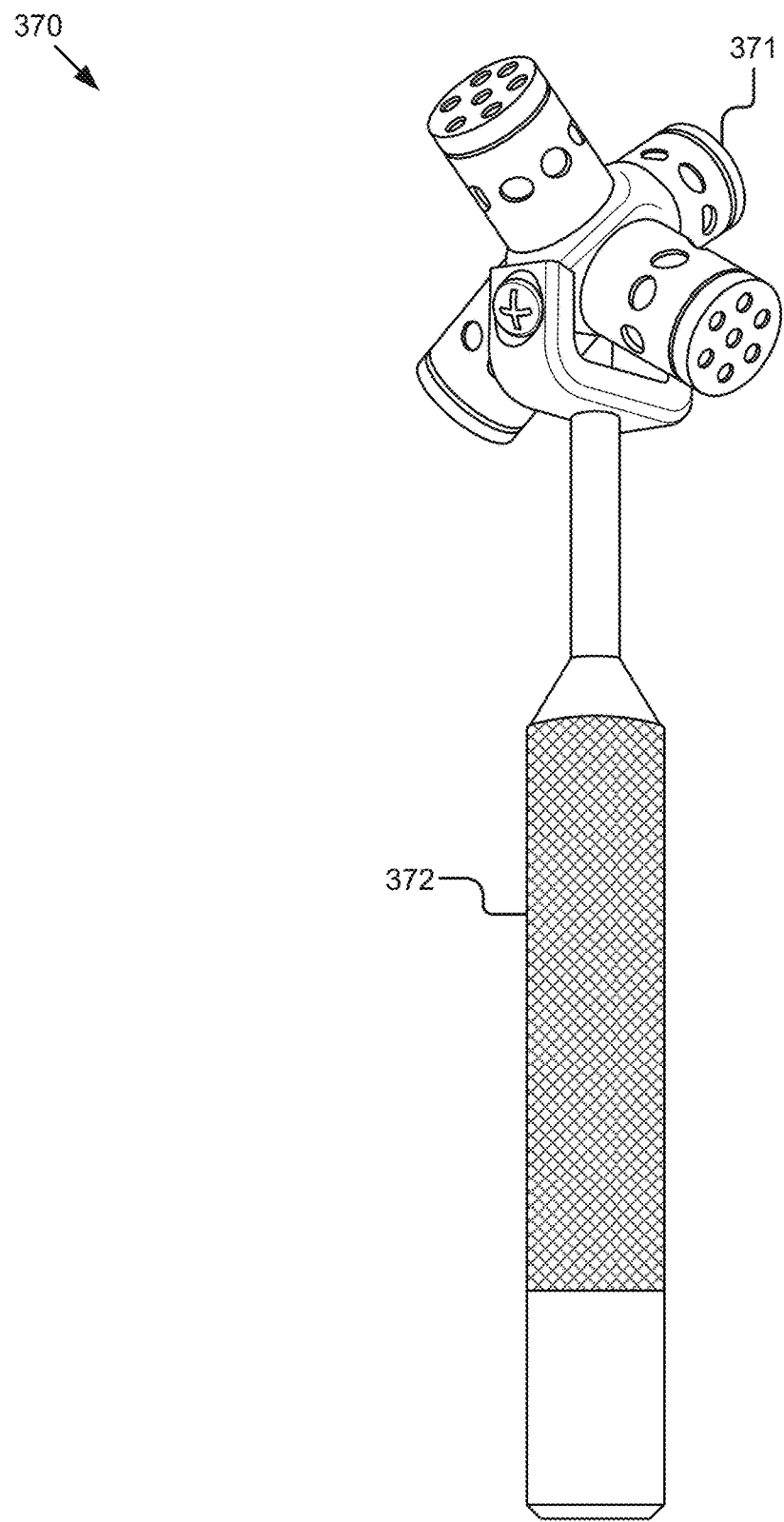
FIG. 3C illustrates an example microphone array according to some embodiments.

FIG. 3C illustrates an example microphone array 370. In this example the microphone array 370 includes four sound-field microphones 371 positioned in four different directions to capture audio for generating 3D audio. The positioning of the microphones allows for recording and reconstructing sonic directionality so that the audio can be adjusted in response to a user moving his or her head during the 3D experience. The microphone unit 370 also includes a mount 372 for mounting the microphone unit 370 to the camera array 101. The mount design is advantageous over a boom microphone, which might interfere with the field of view of the lenses.

Figure 4:
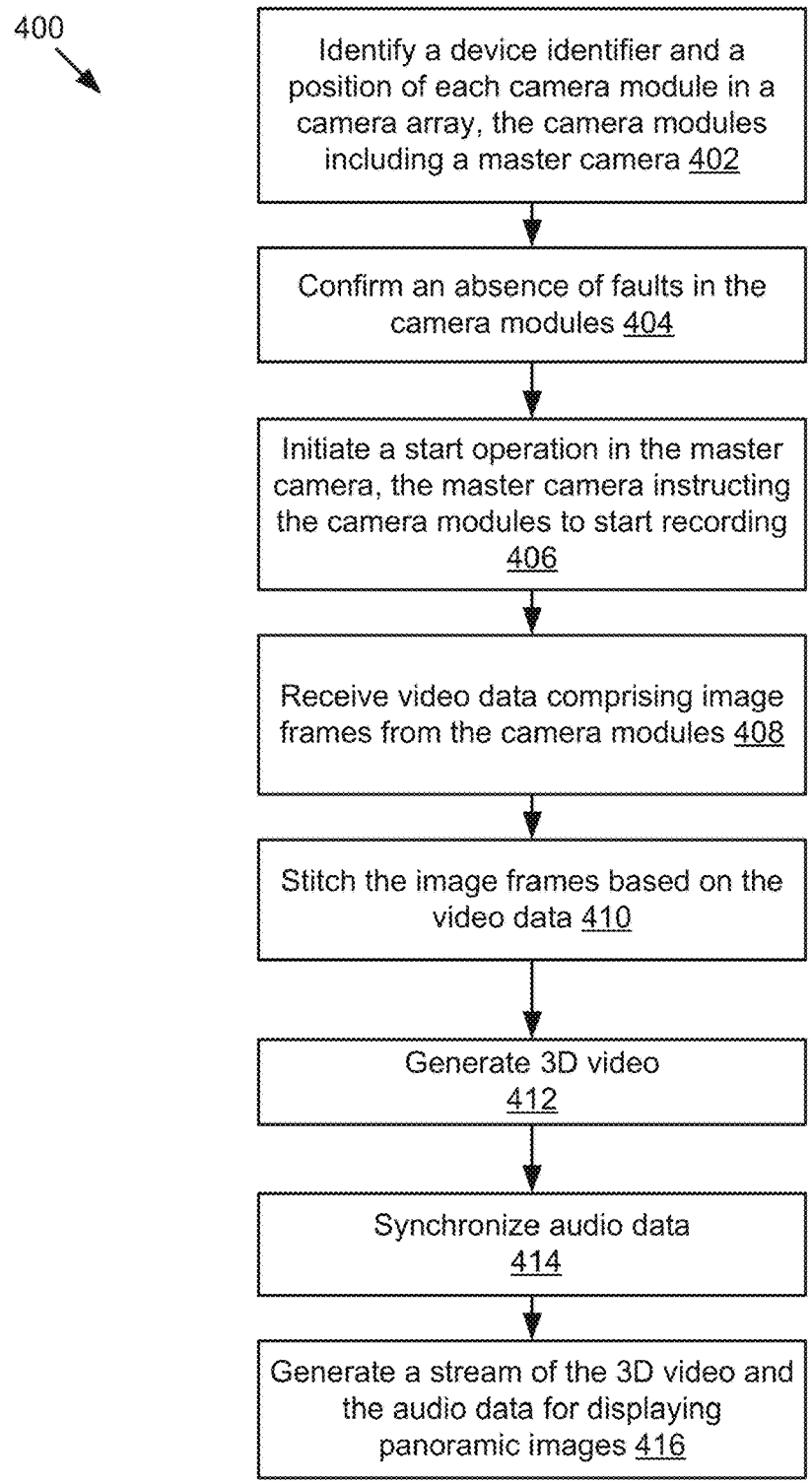
FIG. 4 illustrates an example method for providing video data using a camera array according to some embodiments.
Figure 5:
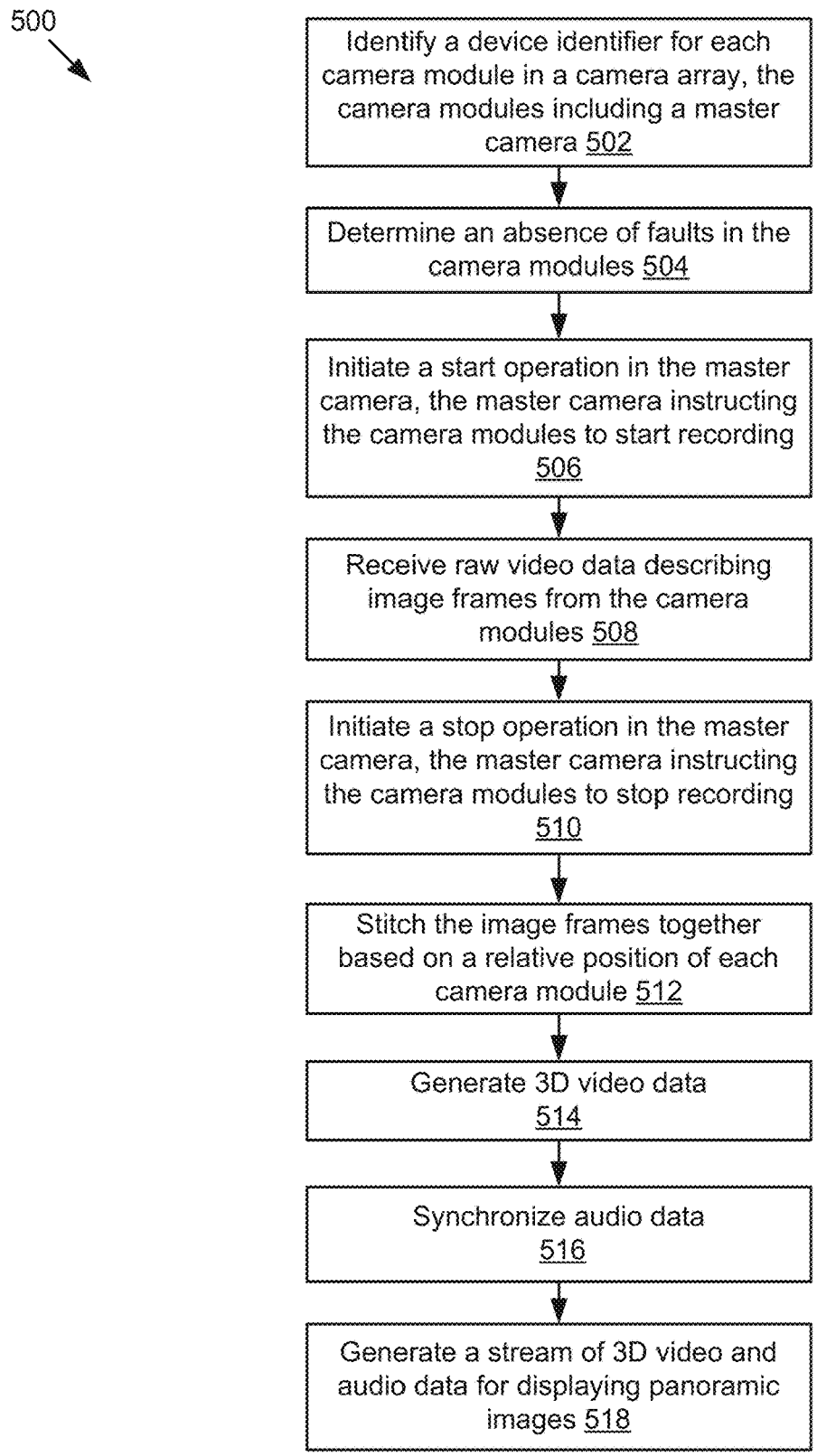
FIG. 5 illustrates an example method for detecting a faulty camera module according to some embodiments.

Referring now to FIG. 4, an example of a method 400 for providing video data using the camera array 101 is described, in accordance with at least one embodiment described herein. The method 400 is described with respect to FIGS. 1 and 2. Although illustrated as discrete blocks, various blocks may be divided into additional blocks, combined into fewer blocks, or eliminated, depending on the desired implementation.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

In some embodiments, the method 400 is performed by an aggregation system 131 comprising a calibration module 204, a fault detection module 206 and a video and audio module 208. The calibration module 204 identifies 402 a device identifier and a position of each camera module 103 in a camera array 101, the camera modules 103 including a master camera. The fault detection module 206 confirms 404 an absence of faults in the camera modules 103. In some embodiments, the fault detection module 206 uses a threshold number of faults to determine whether to proceed. For example, the fault detection module 206 will proceed if two or fewer camera modules 103 are malfunctioning unless the camera modules 103 are next to each other. The fault detection module 206 transmits a confirmation to the video and audio module 208 that there are an absence of faults.

The video and audio module 208 initiates 406 a start operation in the master camera, the master camera instructing the other camera modules 103 to start recording. For example, the master camera includes a switch 117 that instructs the other camera modules 103 in the daisy chain configuration to begin recording. The video and audio module 208 may also provide a timestamp for the video data and instruct the camera modules 103 to use a particular filename.

The video and audio module 208 receives 408 video data comprising image frames from the camera modules 103. The video and audio module 208 stitches 410 the image frames together based on the video data, generates 412 3D video, synthesizes 414 audio data, and generates 416 a stream of the 3D video and the audio data for displaying panoramic images. In some embodiments, the video and audio module 208 stitches the image frames together from each of the camera modules 103 based on a timestamp associated with each of the frames.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

FIG. 4 illustrates an example method 400 for detecting a faulty camera module in accordance with at least one embodiment described herein. The method 400 is described with respect to FIGS. 1 and 2. Although illustrated as discrete blocks, various blocks may be divided into additional blocks, combined into fewer blocks, or eliminated, depending on the desired implementation.

In some embodiments, the method 400 is performed by an aggregation system 131 comprising a calibration module 204, a fault detection module 206 and a video and audio module 208. The calibration module 204 identifies 502 a device identifier for each camera module 103 in a camera array 101, the camera modules 103 including a master camera. The fault detection module 206 determines 504 an absence of faults in the camera modules 103. The fault detection module 206 transmits the determination to the video and audio module 208.

The video and audio module 208 initiates 506 a start operation in the master camera, the master camera instructing the camera modules 103 to start recording. The video and audio module 208 receives 508 video data describing image frames from the camera modules. The video and audio module 208 initiates 510 a stop operation in the master camera, the master camera instructing the camera modules to stop recording.

The video and audio module 208 then stitches 512 the image frames together based on a relative position of each camera module 103. In some embodiments, the relative position is determined from an independently performed geometric calibration. In other embodiments, the calibration module 204 performs geometric calibration after the video is recorded using the video content. For example, the video and audio module 208 uses the relative position of each camera module 103 in combination with a stitching algorithm to perform the stitching. The video and audio module 208 generates 514 3D video data. The video and audio module 208 synthesizes 516 audio data. For example, the video and audio module 208 uses the audio from four different microphones to create audio that is adjusted depending on the angle of the user's head during the virtual reality experience. The video and audio module 208 generates 518 a stream of 3D video and audio data for displaying panoramic images.

Referring now to FIGS. 6-11. FIGS. 3A and 3B described above illustrated an example embodiment of the camera array 301 and camera modules 302. FIGS. 6-11 describe a different example embodiment of these elements and other elements.

Figure 6:
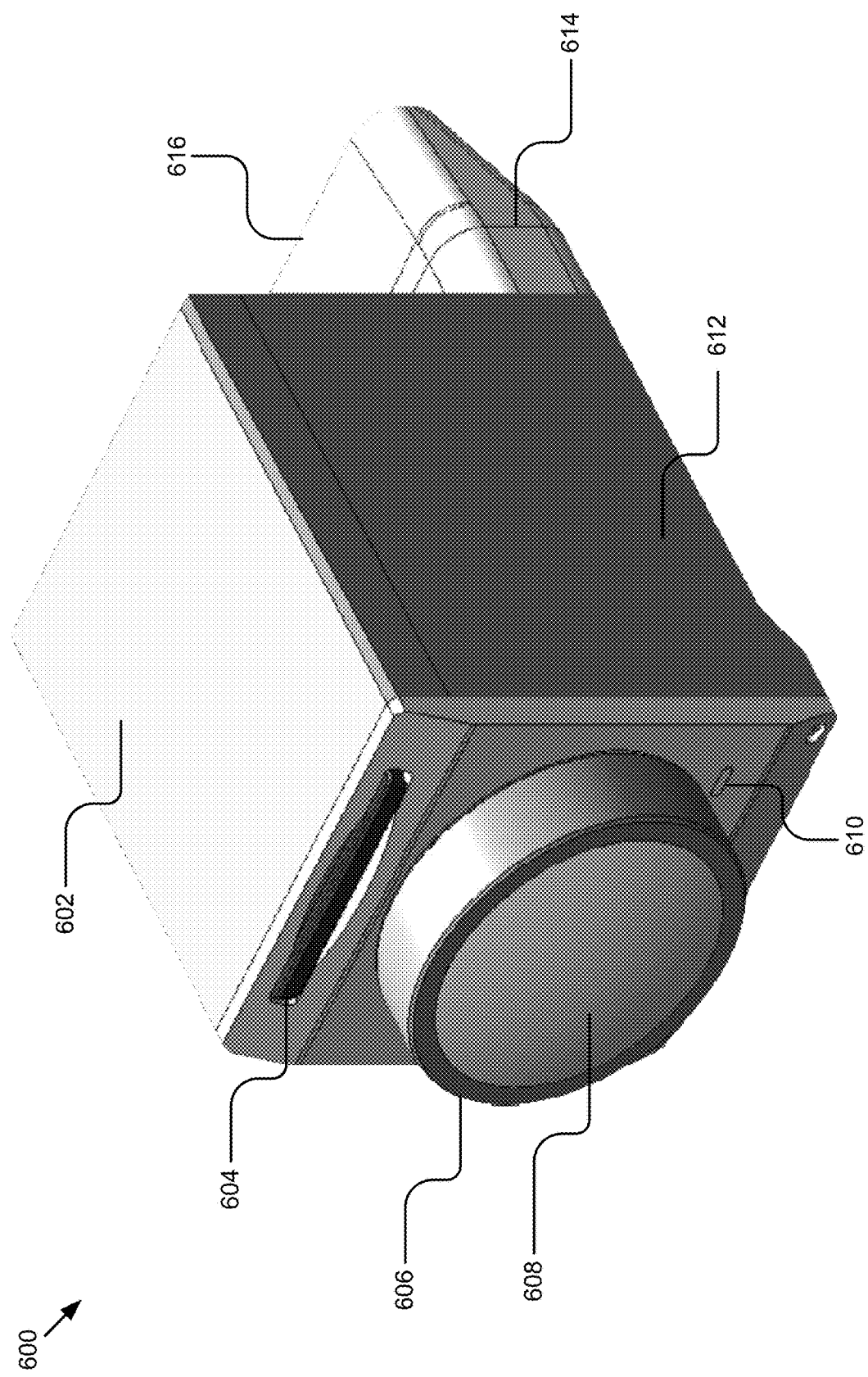
FIG. 6 illustrates a camera module according to some embodiments.

FIG. 6 illustrates a camera module 600 according to some embodiments. The camera module 600 may be an embodiment of the camera module 103. As such, all descriptions of the camera module 103 may be applicable to the camera module 600.

The camera module 600 may include one or more of the following elements: a housing cover 602; an external SD card reader 604; a lens mount 606; a lens 608; an indicator light emitting diode (LED) 610; a housing body 612; a protective boot 614 for protecting USB and daisy chain cables; and an outlet 616 for the USB and daisy chain cables to enter and exit the protective boot 614. The camera module 600 may also include a microphone built into the front of the housing body 612 on the same side of the housing body 612 that includes the lens 608. The microphones may include soundfield microphones. In this way, an array of camera modules 600 will also include an array of microphones having performance similar or better than the microphone array 370 described above with reference to FIG. 3C.

In one embodiment, the camera module 600 may record in at least 1080p video (otherwise known as Full HD video). As will be described below with reference to FIGS. 7, 8 and 9, the camera module 600 may be an element of a camera array such as camera array 700 described below with reference to FIG. 7A. The camera array may include twenty four different camera modules 600. In one embodiment, each of the camera modules 600 included in the camera array may record up to one hundred twenty frames per second (120 frames per second). In one embodiment, the camera modules 600 may record in a range of sixty frames per second to one hundred eighty frames per second (60 frames per second to 180 frames per second).

In one embodiment, the camera module 600 includes a camera sensor (not pictured). The sensor may include a complementary metal-oxide-semiconductor sensor (CMOS sensor). The sensor may include a CMOS sensor having 2.3 megapixels and a global shutter feature. The sensor may include a CMOS sensor having 20 megapixels and a rolling shutter. The sensor may include one or more of the following features: global shutter; still image; 1920×1200 graphics display resolution at sixty frames per second (60 frames per second); 1920×1200 graphics display resolution at ninety frames per second (90 frames per second); 1920×1080 at one hundred twenty frames per second (120 frames per second); hardware or software configured to provide lens-to-sensor thread-based focus adjustment; and hardware or software configured to provide lens-to-sensor active alignment.

In one embodiment, the camera module 600 may include a camera system on chip (SOC) image signal processor.

In one embodiment, the camera module 600 may include one or more of the following features: a microphone integrated in the housing cover 602 or the housing body 612; an integrated and weatherproof USB hub; one or more USB 2.0 ports; one or more USB 3.0 ports; one or more USB-C ports; a communication unit similar to the communication unit 245 described above with reference to FIG. 2A and configured to provide the camera module 600 with wired and wireless communication functionality; a wired remote for controlling the functionality of one or more camera modules 600; onboard mobile double data rate (mobile DDR) memory such as LPDDR2 or any other DDR variation; an electrically erasable programmable read-only memory (EEPROM) configured to provide per-unit calibration; one or more upstream universal asynchronous receiver/transmitter (UART) devices or modules which may implement the camera-to-camera messaging protocol; one or more downstream UART devices or modules; hardware or software for providing self-generated horizontal synchronization (HSYNC) and self-generated vertical synchronization (VSYNC) signals; a real time clock having a battery capacity of six or more days; one or more three-axis accelerometers; and three or more temperature sensors (e.g., two on the main board, and one on the sensor board).

In one embodiment, the external SD card reader 604 may be configured to be weatherproof. The external SD card reader 604 may include one or more gaskets or O-rings configured so that the external SD card reader 604 is waterproof up to ten atmospheres. In one embodiment, the external SD card reader 604 may be a full size SD card reader. The external SD card reader 604 may be fully accessible from the outside of the camera module 600 so that the camera module 600 does not have to be removed from the camera array.

In one embodiment, the lens 608 may include a wide-angle lens. The lens 608 may include a one hundred and thirty degree field of view (130 degree field of view). Optionally, the lens 608 may include a field of view being substantially one hundred and thirty degrees. The lens 608 may include a one hundred and ten degree horizontal field of view (110 degree horizontal field of view). Optionally, the lens 608 may include a horizontal field of view being substantially one hundred and ten degrees. The lens 608 may include a seventy degree vertical field of view (70 degree vertical field of view). Optionally, the lens 608 may include a vertical field of view being substantially seventy degrees. The lens 608 may include a 13.268 millimeter image circle. Optionally, the lens 608 may include an image circle being substantially 13.268 millimeters. The lens 608 may include an f-number of f/2.9. The lens 608 may include a sixty-five centimeter (65 centimeter) to infinity depth field of view. Optionally, the lens 608 may include a depth field being substantially sixty-five centimeters to infinity. The lens 608 may be configured to include fisheye distortion. The lens 608 may be configured to include an optical low-pass filter. The lens 608 may be mounted to include a lens protection cap.

In one embodiment, the indicator light LED 610 may include a tri-color LED indicator. The camera module 600 or the camera array may include code and routines such as firmware to provide the following functionality for the indicator light LED 610 to indicate the status of the camera module 600: power-up indication; boot process indication; ready-to-record or standby indication; recording indication; and one or more error states (e.g., SD card is missing, SD card is full, heartbeat signal is missed for camera synchronization, etc.).

In one embodiment, the housing bodying 612 and the protective boot 614 may be configured to be weatherproof or waterproof.

Figure 7A:
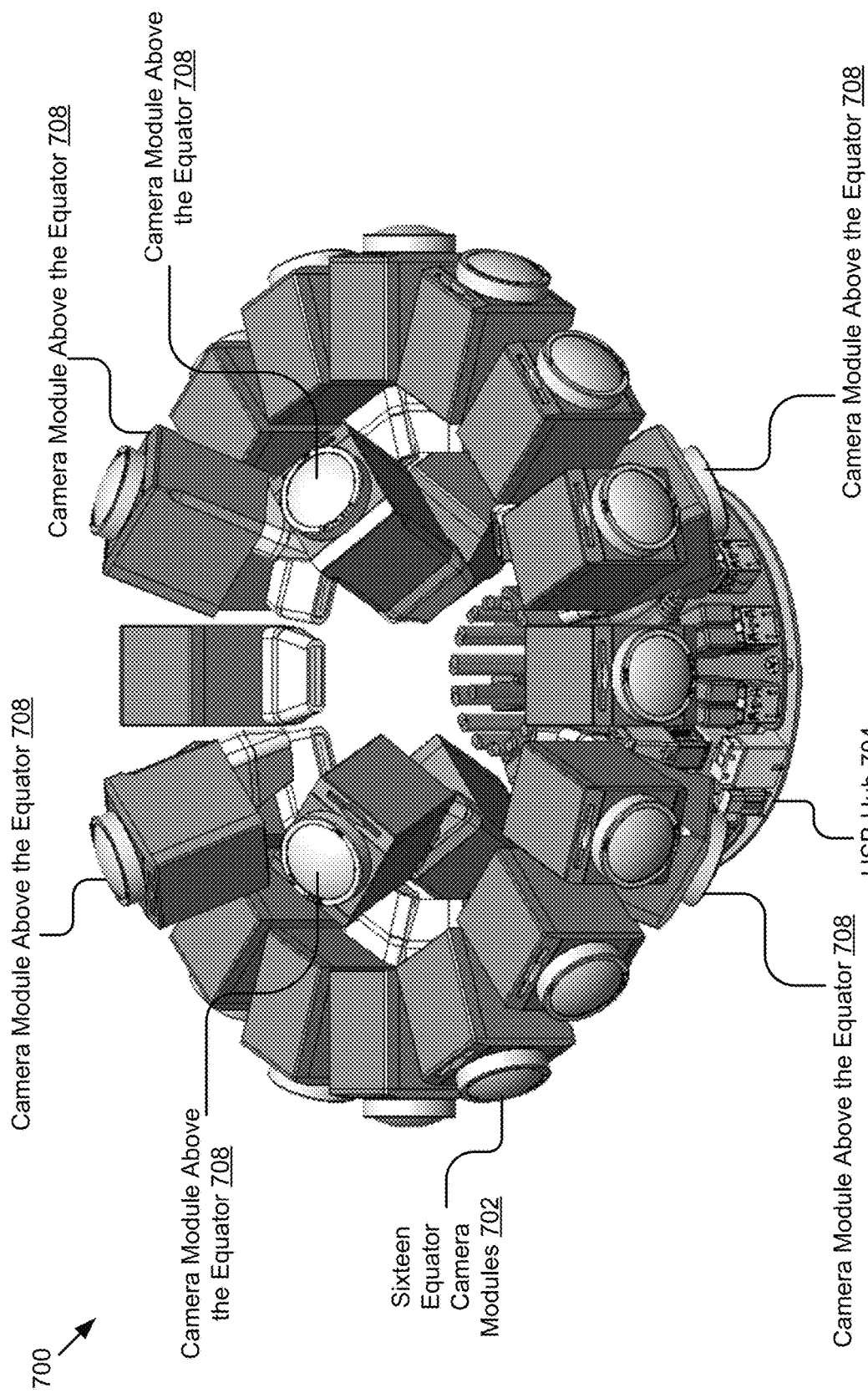
FIG. 7A illustrates a camera array according to some embodiments.

FIG. 7A illustrates a camera array 700 according to some embodiments. The camera array 700 may be an embodiment of the camera array 101 described above with reference to FIGS. 1-5. As such, all descriptions of the camera array 101 may be application to the camera array 700 depicted in FIG. 7A.

The camera array 700 may include twenty four different camera modules 600. One of the camera modules 600 may include a master camera module. The remaining twenty three camera modules 600 may include slave camera modules. All descriptions provided above with reference to master and slave configurations of camera modules 103 are also applicable to the camera modules 600 included in the camera array 700.

For the purpose of clarity, assume that the camera array 700 is arranged as a globe having an equator. The USB hub 704 may be coupled to the camera array 700 at the bottom of the camera array. The USB hub 704 may be configured to be communicatively coupled to the connection hub 123 described above with reference to FIG. 1. Sixteen of the camera modules 600 may be arranged around the equator of the camera array 700. The equator is the center strip camera modules 600 that form a belt around the camera array 700. These sixteen camera modules 600 may be indicated by element 702 of FIG. 7A and referred to collectively as "the equator cameras 702" or individually as "an equator camera 702." The equator cameras 702 may be configured to capture images having a portrait orientation.

The camera array 700 may include four camera modules 600 configured below the equator cameras 702 as indicated by element 706 and referred to collectively as "the below the equator cameras 706" or individually as "a below the equator camera 706." The below the equator cameras 706 may be configured to capture images having a landscape orientation. The camera array 700 may include four camera modules 600 configured above the equator cameras 702 as indicated by element 708 and referred to collectively as "the above the equator cameras 708" or individually as "an above the equator camera 708." The above the equator cameras 708 may be configured to capture images having a landscape orientation.

Each of the below the equator cameras 706 may positioned at a pitch of negative sixty-five degrees (−65 degrees) relative to the equator cameras 702 or substantially negative sixty-five degrees relative to the equator cameras 702. Each of the above the equator cameras 708 may positioned at a pitch of positive sixty-five degrees (+65 degrees) relative to the equator cameras 702 or substantially positive sixty-five degrees relative to the equator cameras 702.

In one embodiment, one or more of the camera modules 600 included in the camera array 700 may be configured to provide a 3× field of view overlap. For example, each pixel recorded by the camera array 700 may be recorded by three different camera modules 600. The three different camera modules 600 may be located side-by-side. For example, for each pixel included in the 3D video generated by the system 200 described above with reference to FIG. 2A, three of the equator camera modules 702 may record their own set of video data for that particular pixel. The video data for these three different equator camera modules 702 may then be used to generate panoramas for generating the 3D video which includes the pixel.

For example, the aggregation system 200 described above with reference to FIGS. 1 and 2 may stitch one or more image frames to form a panorama including the pixel. The pixel may be captured by three different video modules 600 configured to provide a 3× field of view overlap. Each of the three different camera modules 600 may capture a separate image frame that includes the pixel from a different perspective. As a result, the aggregation system 200 may have three different image frames (i.e., three different candidate sets of video data) to select from when forming the panorama including the pixel. The image frames may be stitched together based on a relative position of each camera module 600. When selecting among the candidate image frames for depicting the pixel, the aggregation system 200 may select the image frame that would result in the least amount of stitching artifacts, ghosting or other stitching aberrations associated with low quality 3D video. A simplified example of this concept is described in more detail below with reference to FIG. 7B.

In one embodiment, the camera array 700 may include sixteen different camera modules 600. For example, the camera array 700 may include sixteen equator cameras 702 but not the four above the equator cameras 708 or the four below the equator cameras 706. In this embodiment, one or more of the equator cameras 702 may have a field of view overlap of 2× to 3×. For example, the field of view overlap may be 2.4×. The sixteen equator cameras 702 may be synchronized and configured to capture one or more stereoscopic images. Each stereoscopic image may be associated with the equator camera 702 which captured that image. The sixteen equator cameras 702 may be synchronized for time so that they each capture a stereoscopic image at the same time or substantially the same time. Each stereoscopic image may be associated with a timestamp indicating when the image was captured. The synchronization of the sixteen equator camera modules 702 may be configured so that the camera array 700 captures a three hundred and sixty degree view of an environment where the camera array 700 is located. The timestamps and the association of each stereoscopic image with the equator camera 702 which captured that image may be used by the by the aggregation system 131 to process the data describing the stereoscopic images to generate 3D video content.

In one embodiment, the aggregation system 131 may generate the three-dimensional video by stitching the stereoscopic images together to generate three-dimensional video that depicts the environment where the camera array 700 is located. For example, the camera array 700 stitches the stereoscopic images together by identifying, for each stereoscopic image, which of the sixteen equator camera modules 702 captured the stereoscopic image and the time when the stereoscopic image was captured so that, for a given time frame, at least sixteen stereoscopic images are identified as having been captured at substantially the same time. The stereoscopic images may then be stitched together in an order corresponding to arrangement of the sixteen equator camera modules 702 around the equator of the camera array 700 so that the stitched stereoscopic images form the three hundred and sixty degree view of the environment.

In one embodiment, the 3D video content may include a virtual tour for a classroom. For example, students in a class may view the 3D video content to virtually tour an environment selected by a teacher or instructor of the class.

In one embodiment, the system 100 may include a plurality of client devices 127 which each include their own aggregation system 131 and the plurality of client devices 127 may work together so that they process the stereoscopic images quicker, more efficiently, or to produce images including less stitching errors. The 3D video content may then be stored to a video server. The video server may be communicatively coupled to the network 105. The 3D video content may be indexed by the video server. The video server may include a search engine. Users may access the video server to search for, identity and view the 3D video content.

In one embodiment, the camera array 700 may include twenty different camera modules 600. For example, the camera array 700 may include sixteen equator cameras 702, two above the equator cameras 708 and two below the equator cameras 706. In this embodiment, one or more of the camera modules 600 may have a field of view overlap of 2× to 3×. For example, the field of view overlap may be 2.4×. The twenty camera modules 600 may be synchronized and configured to capture one or more stereoscopic images. Each stereoscopic image may be associated with the camera module 600 which captured that image. The camera modules 600 may be synchronized for time so that they each capture a stereoscopic image at the same time or substantially the same time.

In one embodiment, the camera array 700 does not include a master camera module 103a. For example, the camera array 700 may include one or more electronic circuits which are configured to provide the functionality of the master camera module. The electronic circuit may be a hardware device communicative coupled to a daisy chain of camera modules 600 and configured to provide a synchronizing timing input to the daisy chain. In this way, all of the camera modules 600 may function as slave camera modules responsive to the synchronizing timing provided by the hardware device.

Figure 7B:
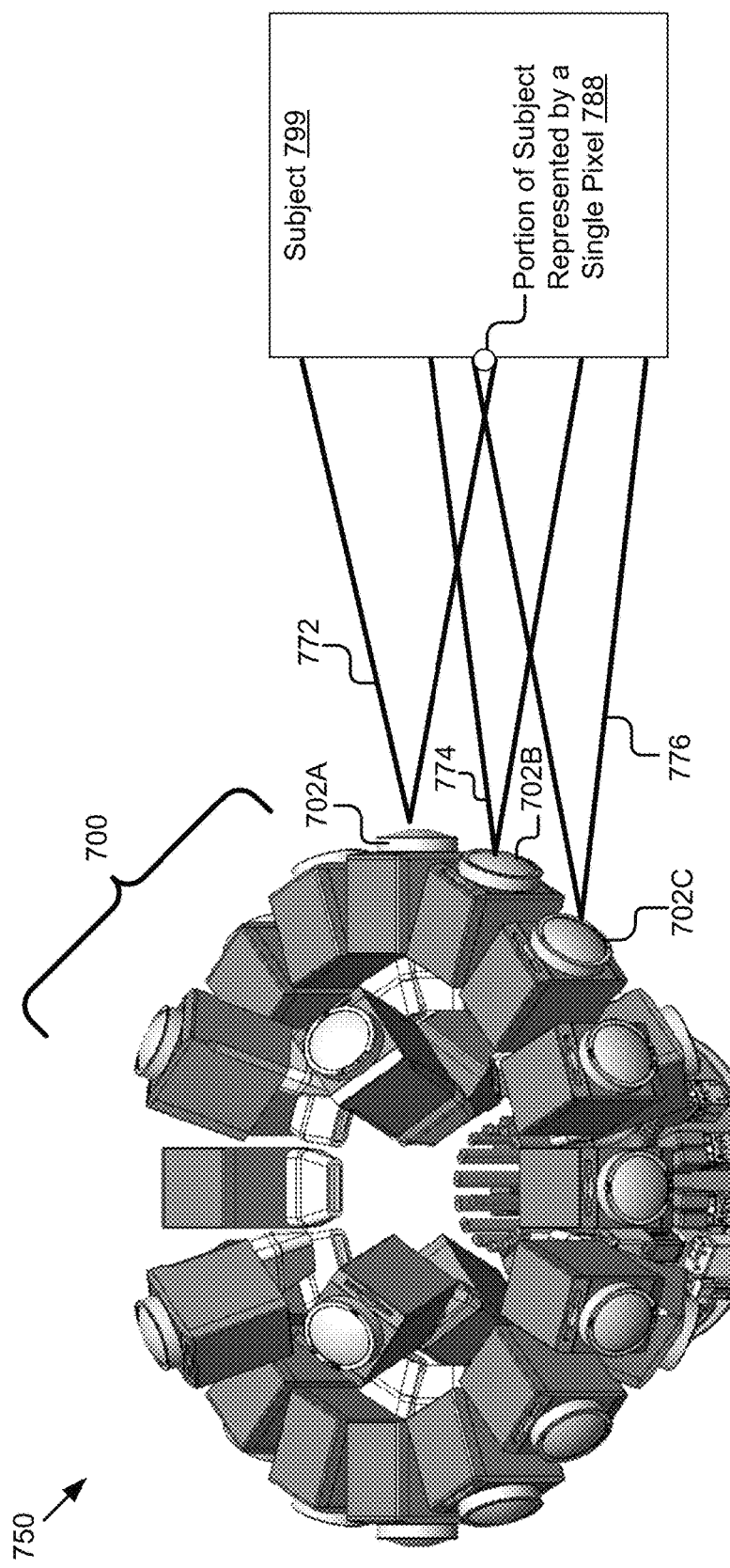
FIG. 7B illustrates an example operating environment including a camera array recording a subject according to some embodiments.

FIG. 7B illustrates an example operating environment 750 including a camera array 700 recording a subject 799 according to some embodiments. Assume the subject 799 is being recorded by the camera array 700. The subject 799 may include one or more portions such as portion 788. Portion 788 is the amount of the subject 799 that is represented by a single pixel in the 3D video content generated when the camera array 700 records the subject 799 and the aggregation system 131 processes the video data generated from this recording according to one or more of the methods 400, 500 described above with reference to FIGS. 4 and 5.

The camera modules 600 of the camera array 700 are configured to provide a 3× field of view overlap. For example, the camera modules 600 are configured so that each pixel included in the 3D video content is recorded by three different camera modules 600. Here, the portion 788 is being recorded by a first equator camera 702A, a second equator camera 702B and a third equator camera 702C. Element 772 includes the field of view for the first equator camera 702A. Element 774 includes the field of view for the second equator camera 702B. Element 776 includes the field of view for the third equator camera 702C. Each of these fields of view captures the portion 788. In this way, the aggregation system 131 has three different sets of video data (one for each camera 702A, 702B, 702C) to select from when creating the pixel included in the 3D video that represents the portion 788. Experimentation has shown that this configuration provides numerous benefits, including a decrease in stitching artifacts, ghosting or other stitching aberrations associated with low quality 3D video. For example, when two stereoscopic images from adjacent cameras 702A and 702B are stitched together, the region associated with the border of these two stereoscopic images may have a stitching artifact. However, experimentation has shown that a configuration of the cameras 702, 702B to provide a 3× field of view overlap reduces, minimizes or eliminates instances of such stitching artifacts.

Figure 8:
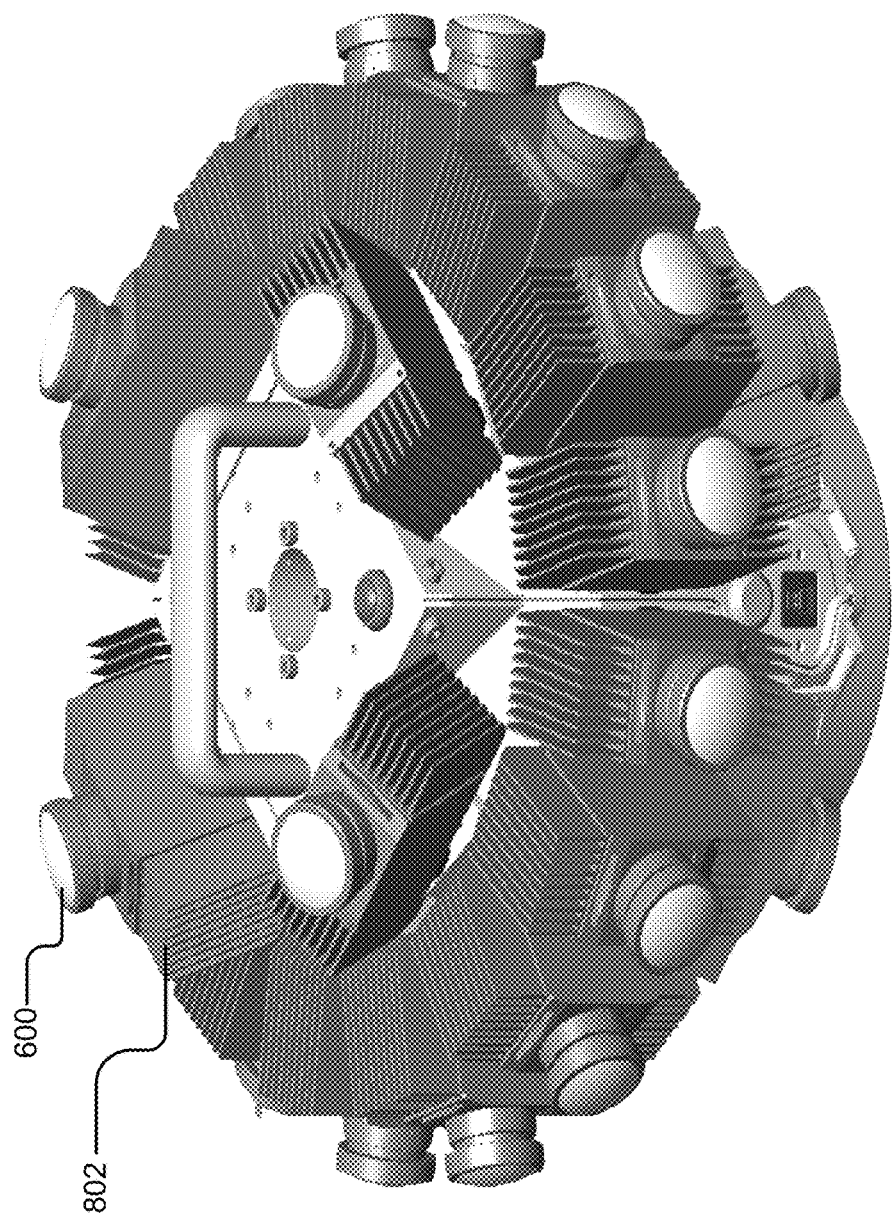
FIG. 8 illustrates a camera array having camera modules including heat dissipation elements according to some embodiments.

FIG. 8 illustrates a camera array 800 according to some embodiments. Here, each of the camera modules 600 may include a heat dissipation element 802. The heat dissipation element 802 may include a heat sink or some other device coupled to the camera module 600 and configured to dissipate the heat of the camera module 600 or the neighboring camera modules 600.

The camera array 800 may be an embodiment of the camera array 101 described above with reference to FIGS. 1-5. As such, all descriptions of the camera array 101 may be applicable to the camera array 800 depicted in FIG. 8.

The camera array 800 includes twenty four different camera modules 600. One of the camera modules 600 may include a master camera module. The remaining twenty three camera modules 600 may include slave camera modules. All descriptions provided above with reference to master and slave configurations of camera modules 103 are also applicable to the camera modules 600 included in the camera array 800.

Figure 9:
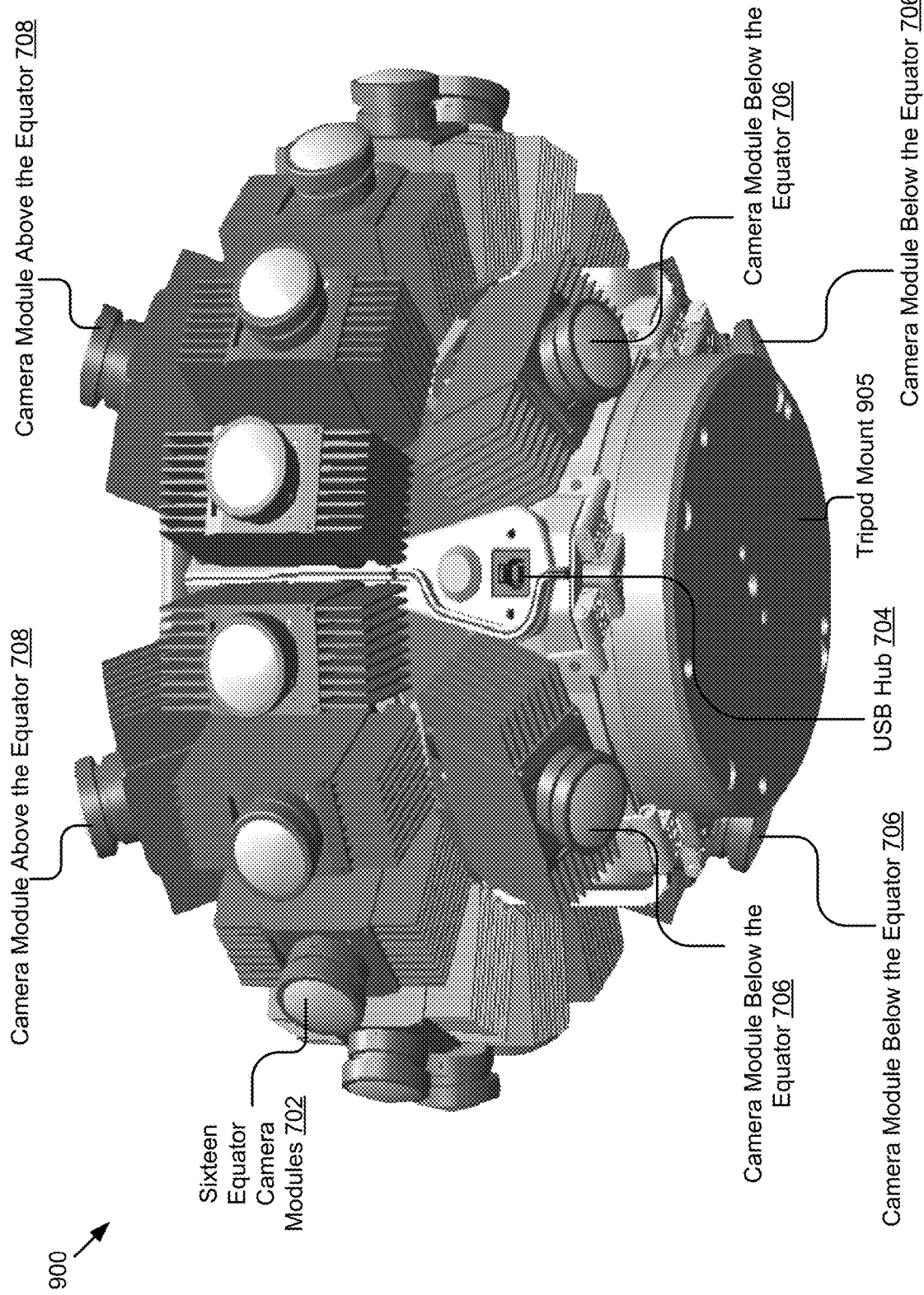
FIG. 9 illustrates a camera array according to some embodiments.

FIG. 9 illustrates a camera array 900 according to some embodiments. Compared to FIG. 7A, camera array 900 is positioned so that all four of the camera modules below the equator 706 are visible.

The camera array 900 may include a tripod mount 905. The tripod mount 905 may include a standard tripod mount or a boom tripod mount.

The camera array 900 may include an expansion port 907. The expansion port 907 may include hardware or software configured to enable the camera array 900 to be communicatively coupled to one or more of the following accessories: a wired remote configured to provide inputs to the camera array 900 to control or configure the camera array 900; a wireless dongle configured to enable the camera array 900 to receive inputs from, and provide outputs to, one or more devices via Bluetooth™, Bluetooth LE, WiFi or any other communication including the network 105; a touch panel display configured to provide inputs to the camera array 900 to control or configure the camera array 900; etc.

The expansion port 907 may include one or more communicative couplings. The expansion port 907 may include one or more pins. The accessories listed above may include one or more hardware communicative coupling devices. For example, an accessory may include a hardware bus. The hardware bus may correspond to one or more protocols or standards. For example, the hardware bus may include one or more of the following: USB port (e.g, USB 2.0, 3.0 or Type-C); a High-Definition Multimedia port; a Lightning connector; or any other hardware bus that is similar or derivative of those described above. The expansion port 907 may include a male or female port corresponding to the one or more of the accessories listed above. The expansion port 907 may include software or other hardware necessary to provide its functionality. For example, the expansion port 907 may include an application programming interface and a signal line configured to provide a communicative coupling to the bus 220 described above with reference to FIG. 2A.

Although not depicted in FIG. 9, the camera array 900 may include one or more of the following features: a carrying handle or strap; one or more straight power cables; one or more right angle power cables; a power switch; and a record button.

The camera array 900 may be an embodiment of the camera array 101 described above with reference to FIGS. 1-5. As such, all descriptions of the camera array 101 may be application to the camera array 900 depicted in FIG. 9.

The camera array 900 includes twenty four different camera modules 600. One of the camera modules 600 may include a master camera module. The remaining twenty three camera modules 600 may include slave camera modules. All descriptions provided above with reference to master and slave configurations of camera modules 103 are also applicable to the camera modules 600 included in the camera array 900.

Figure 10:
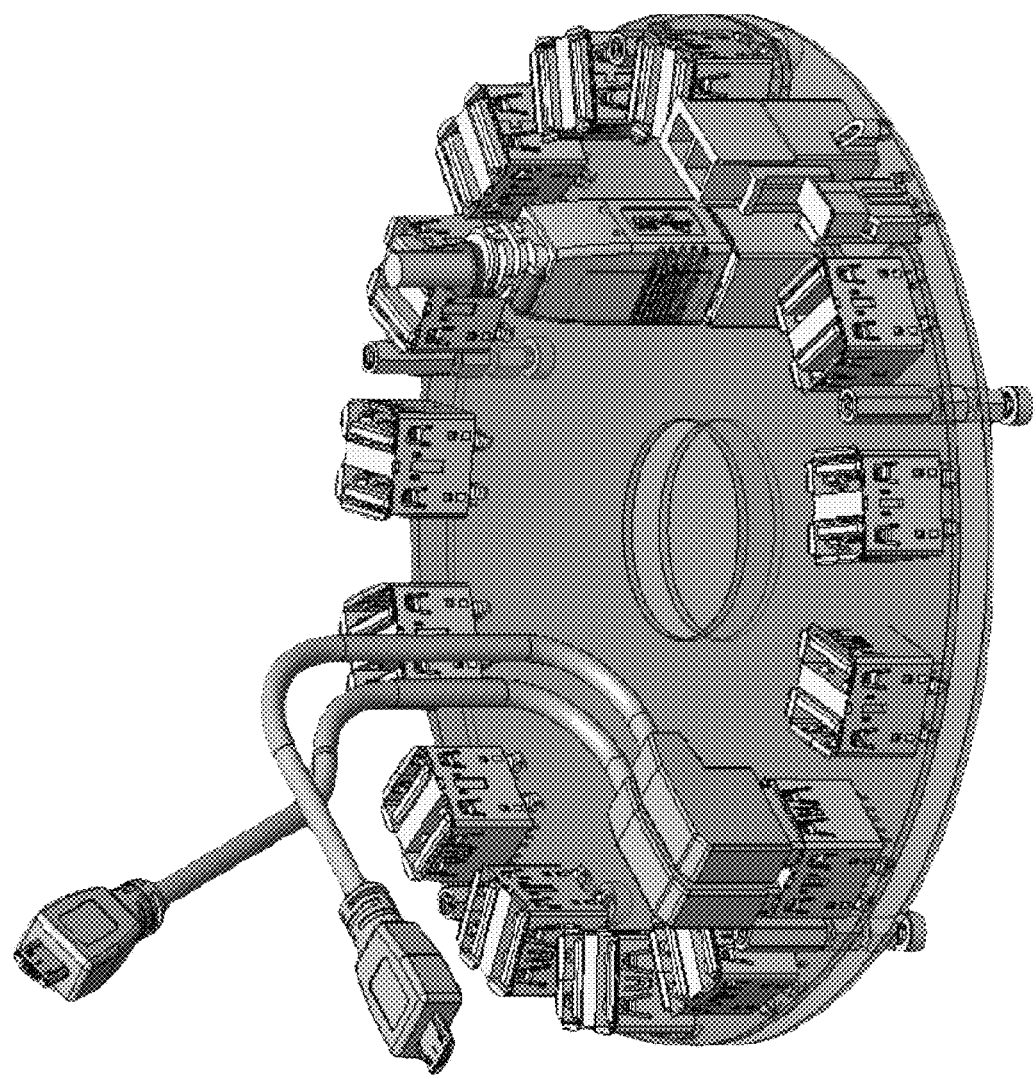
FIG. 10 illustrates the universal serial bus hub according to some embodiments.

FIG. 10 illustrates the USB hub 704 according to some embodiments. The USB hub 704 may include one or more USB ports. The USB ports may include one or more of the following: a USB 2.0 port; a USB 3.0 port; a USB-C port; or any other type of USB port that is a derivative of USB 2.0, USB 3.0 or USB-C.

FIG. 11 illustrates camera modules 600A, 600B including heat dissipation elements 802A, 802B. The first camera module 600A is positioned to provide a front facing view of the first camera module 600A. The second camera module 600B is positioned to provide a rear facing view of the second camera module 600B. From the rear facing view, the USB and daisy chain ports 1105 of the second camera module 600B are viewable.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware embodiments configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware embodiments or a combination of software and specific hardware embodiments are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the inventions have been described in detail, it may be understood that the various changes, substitutions, and alterations could be made hereto without departing from the spirit and scope of the invention.

What is claimed is:

1. A camera system comprising:
   a camera array comprising a set of camera modules; and
   an aggregation system communicatively coupled to the camera array to receive video data from the camera array, the aggregation system including code and routines stored on a non-transitory memory and configured to provide lens distortion correction for the video data based on determining an angle of a three-dimensional point and determining an undistorted distance to an optical center of a lens of a camera module of the set of camera modules.

2. The system of claim 1, wherein determining the undistorted distance (d) to the optical center of the lens of the camera module includes $d=((\sqrt{4*\alpha*k2+k1*k1})-k1)/(2*k2))$, where k1 is a first lens distortion parameter, k2 is a second lens distortion parameter, k3 is a third lens distortion parameter and k3 equals zero, and $\alpha$ is the angle of the three-dimensional point.

3. The system of claim 1, wherein determining the undistorted distance (d) to the optical center of the lens of the camera module includes $d=\alpha/k1$, where a first lens distortion parameter $k1 \neq 0$, a second lens distortion parameter k2 equals zero, a third lens distortion parameter k3 equals zero, and $\alpha$ is the angle of the three-dimensional point.

4. The system of claim 1, wherein determining the undistorted distance (d) to the optical center of the lens of the camera module includes:

$$d=-k2/(3.*k3)+(\text{cbrt}(2.)*(-\text{pow}(k2,2)+3.*k1*k3))/\\(3.*k3*\text{cbrt}(2*\text{pow}(k2,3)-9.*k2*k3-27.*\alpha*\text{pow}\\(k3,2)+\sqrt{4.*\text{pow}(-\text{pow}(k2,2)+3.*k1*k3,3)}+\\\text{pow}(2*\text{pow}(k2,3)-9.*k1*k2*k3-27.*\alpha*\text{pow}(k3,\\2),2))))-\text{cbrt}(2.*\text{pow}(k2,3)-9.*k1*k2*k3-\\27.*\alpha*\text{pow}(k3,2)+\sqrt{4*\text{pow}(-\text{pow}\\(k2,2)+3*k1*k3,3)}+\text{pow}(2*\text{pow}(k2,3)-\\9.*k1*k2*k3-27.*\alpha*\text{pow}(k3,2),2)))/(3.*\\\text{cbrt}(2.)*k3);$$

where k1 is a first lens distortion parameter, k2 is a second lens distortion parameter, k3 is a third lens distortion parameter, $\alpha$ is the angle of the three-dimensional point, pow(n,p) denotes $n^P$, and cbrt(n) is a cubic root of n or $n^{(2/3)}$.

5. The system of claim 1, wherein the aggregation system generates three-dimensional video data that is used for at least one of virtual reality content, augmented reality content, mixed reality content, or cross reality content.

6. The system of claim 1, wherein the aggregation system is further configured to provide the lens distortion correction for the video data by mapping the three-dimensional point to a two-dimensional point on an undistorted two-dimensional image based on the angle of the three-dimensional point and the undistorted distance to the center of the lens of the camera module of the set of camera modules.

7. The system of claim 1, wherein the camera array includes an overall status indicator configured to indicate a faulty status of a fault occurring in any of the camera modules and wherein the camera modules further include individual status indicators configured to indicate the faulty status of the fault occurring in one of the camera modules.

8. The system of claim 1, wherein each camera module includes a soundfield microphone so that the camera array includes an array of soundfield microphones and wherein the array of soundfield microphones is configured to capture audio for enabling reconstruction of sound from any arbitrary direction.

9. The system of claim 1, wherein the aggregation system is further configured to generate a stream of three-dimensional video and audio data for displaying panoramic images.

10. The system of claim 9, further comprising a viewing system configured to decode and render the three-dimensional video and play the audio data on a virtual reality display and a surround sound system.

11. A computer-implemented method comprising:
identifying, with one or more processors, a device identifier and a position of each camera module in a camera array;
receiving video data comprising image frames from the camera modules;
removing one or more lens distortion effects present in the image frames to map a three-dimensional real-world point onto an undistorted two-dimensional image by determining an angle of a normalized three-dimensional point, determining an undistorted distance to an optical center of a lens of one of the camera modules in the camera array, and determining (x, y) coordinates of a two-dimensional point of the undistorted two-dimensional image;
stitching the image frames together based on the video data;
generating three-dimensional video;
synthesizing audio data; and
generating a stream of three-dimensional video and the audio data for displaying panoramic Images.

12. The method of claim 11, wherein determining the undistorted distance (d) to the optical center of the lens of the camera module includes d=((sqrt(4*α*k2+kl*kl)−kl)/(2*k2)), where kl is a first lens distortion parameter, k2 is a second lens distortion parameter, k3 is a third lens distortion parameter and k3 equals zero, and α is an angle of a three-dimensional point.

13. The method of claim 11, wherein determining the undistorted distance (d) to the optical center of the lens of the camera module includes d=a/kl, where a first lens distortion parameter kl≠0, a second lens distortion parameter k2 equals zero, a third lens distortion parameter k3 equals zero, and a is an angle of a three-dimensional point.

14. The method of claim 11, wherein the stream of three-dimensional video is used for at least one of virtual reality content, augmented reality content, mixed reality content, or cross reality content.

15. A non-transitory computer-usable medium including instructions that when executed by a processor cause the processor to:
identify a device identifier and a position of each camera module in a camera array;
receive video data comprising image frames from the camera modules;
remove one or more lens distortion effects from the image frames by to map a three-dimensional real-world point onto an undistorted two-dimensional image by determining a length of the three-dimensional real-world point, determining a normalized three-dimensional point, determining an angle of the normalized three-dimensional point, determining an undistorted distance to an optical center of a lens of one of the camera modules in the camera array, and determining (x, y) coordinates of a two-dimensional point of the undistorted two-dimensional image;
stitch the image frames together based on the video data, wherein the image frames are stitched together based on a relative position of each camera module;
generate three-dimensional video;
synthesize audio data; and
generate a stream of three-dimensional video and the audio data for displaying panoramic Images.

16. The computer-usable medium of claim 15, wherein determining the undistorted distance (d) to the optical center of the lens of the camera module includes d=((sqrt(4*α*k2+kl*kl)−kl)/(2*k2)), where kl is a first lens distortion parameter, k2 is a second lens distortion parameter, k3 is a third lens distortion parameter and k3 equals zero, and α is an angle of a three-dimensional point.

17. The computer-usable medium of claim 15, wherein determining the undistorted distance (d) to the optical center of the lens of the camera module includes d=α/kl, where a first lens distortion parameter kl≠0, a second lens distortion parameter k2 equals zero, a third lens distortion parameter k3 equals zero, and α is an angle of a three-dimensional point.

18. The computer-usable medium of claim 15, wherein determining the undistorted distance (d) to the optical center of the lens of the camera module includes:

$d=-k2/(3.*k3)+(\mathrm{cbrt}(2.)*(-\mathrm{pow}(k2,2)+3.*k1*k3))/(3.*k3*\mathrm{cbrt}(2*\mathrm{pow}(k2,3)-9.*k2*k3-27.*\alpha*\mathrm{pow}(k3,2)+\mathrm{sqrt}(4.*\mathrm{pow}(-\mathrm{pow}(k2,2)+3.*k1*k3,3)+\mathrm{pow}(2*\mathrm{pow}(k2,3)-9.*k1*k2*k3-27.*\alpha*\mathrm{pow}(k3,2),2))))-\mathrm{cbrt}(2.*\mathrm{pow}(k2,3)-9.*k1*k2*k3-27.*\alpha*\mathrm{pow}(k3,2)+\mathrm{sqrt}(4*\mathrm{pow}(-\mathrm{pow}(k2,2)+3*k1*k3,3)+\mathrm{pow}(2*\mathrm{pow}(k2,3)-9.*k1*k2*k3-27.*\alpha*\mathrm{pow}(k3,2),2)))/(3.*\mathrm{cbrt}(2.)*k3);$ where kl is a first lens distortion parameter, k2 is a second lens distortion parameter, k3 is a third lens distortion parameter, α is an angle of a three-dimensional point, pow(n,p) denotes $n^P$, and cbrt(n) is a cubic root of n or $n^{(2/3)}$.

19. The computer-usable medium of claim 15, wherein the stream of three-dimensional video is used for at least one of virtual reality content, augmented reality content, mixed reality content, or cross reality content.

20. The computer-usable medium of claim 15, wherein the stream of three-dimensional video is used to display panoramic images.

* * * * *